(12) United States Patent
Maruyama et al.

(10) Patent No.: US 11,787,292 B2
(45) Date of Patent: Oct. 17, 2023

(54) BRAKE CONTROL DEVICE FOR VEHICLE

(71) Applicant: ADVICS CO., LTD., Kariya (JP)

(72) Inventors: Masaki Maruyama, Nagoya (JP); Shunya Watanabe, Kariya (JP)

(73) Assignee: ADVICS CO., LTD., Kariya (JP)

( * ) Notice: Subject to any disclaimer, the term of this patent is extended or adjusted under 35 U.S.C. 154(b) by 506 days.

(21) Appl. No.: 15/733,910

(22) PCT Filed: Jun. 24, 2019

(86) PCT No.: PCT/JP2019/025006
§ 371 (c)(1),
(2) Date: Dec. 1, 2020

(87) PCT Pub. No.: WO2020/004347
PCT Pub. Date: Jan. 2, 2020

(65) Prior Publication Data
US 2021/0221231 A1    Jul. 22, 2021

(30) Foreign Application Priority Data

Jun. 25, 2018 (JP) ................................ 2018-119954

(51) Int. Cl.
*B60T 8/40* (2006.01)
*B60L 7/26* (2006.01)
(Continued)

(52) U.S. Cl.
CPC ...... *B60L 7/26* (2013.01); *B60T 8/17* (2013.01); *B60T 13/686* (2013.01); *B60T 2270/604* (2013.01)

(58) Field of Classification Search
CPC .. B60T 13/686; B60T 8/4059; B60T 2270/60; B60T 2270/604; B60T 8/17; B60L 7/26
See application file for complete search history.

(56) References Cited

U.S. PATENT DOCUMENTS

2008/0300763 A1    12/2008    Mori et al.
2011/0266106 A1*   11/2011    Suzuki ................. B60T 8/96
                                                        188/360

(Continued)

FOREIGN PATENT DOCUMENTS

JP    2008296704 A    12/2008
JP    2019137202 A     8/2019

OTHER PUBLICATIONS

International Search Report (with English Translation) and Written Opinion issued in corresponding International Patent Application No. PCT/JP2019/025006, 7 pages (dated Aug. 27, 2019).

*Primary Examiner* — Bradley T King
(74) *Attorney, Agent, or Firm* — BUCHANAN INGERSOLL ROONEY PC

(57) ABSTRACT

A brake control device applied to a vehicle including a regenerative generator connected to a front wheel has an electric pump, and first and second pressure adjustment valves. The first pressure adjustment valve is provided in a brake fluid reflux path including the electric pump, adjusts the brake fluid to a first hydraulic pressure, and adjusts a rear wheel hydraulic pressure in a rear wheel cylinder to the first hydraulic pressure. The second pressure adjustment valve is provided in the reflux path, reduces the first hydraulic pressure to a second hydraulic pressure, and adjusts front wheel hydraulic pressure in a front wheel cylinder to the second hydraulic pressure. A front wheel flow rate to increase the front wheel hydraulic pressure is calculated using a brake operation member operation amount and a regeneration amount of the regenerative generator. The first pressure adjustment valve is controlled using the front wheel flow rate.

4 Claims, 5 Drawing Sheets

(51) Int. Cl.
*B60T 8/17* (2006.01)
*B60T 13/68* (2006.01)

(56) References Cited

U.S. PATENT DOCUMENTS

| | | | |
|---|---|---|---|
| 2014/0292065 A1* | 10/2014 | Jeon .................. | B60T 8/409 |
| | | | 303/10 |
| 2015/0091369 A1* | 4/2015 | Yamasaki ............ | B60T 13/662 |
| | | | 303/10 |
| 2020/0282840 A1* | 9/2020 | Yamamoto ............. | B60T 13/18 |
| 2021/0197779 A1* | 7/2021 | Maruyama ............ | B60T 13/146 |
| 2021/0229648 A1* | 7/2021 | Yamamoto ............ | B60T 13/586 |
| 2021/0261106 A1* | 8/2021 | Yamamoto ............ | B60T 8/4836 |
| 2021/0276534 A1* | 9/2021 | Maruyama ...... | B60W 30/18127 |

* cited by examiner

BRAKE CONTROL DEVICE FOR VEHICLE

TECHNICAL FIELD

The present disclosure relates to a brake control device for a vehicle.

BACKGROUND ART

Japanese Unexamined Application Publication No. 2008-296704 discloses that, for the purpose of "achieving both control accuracy and responsiveness of hydraulic pressure control of a wheel brake by incorporating a concept of flow rate control in a vehicle brake hydraulic pressure control device that controls an operation of a hydraulic pressure control unit interposed between a hydraulic pressure supply source and the wheel brake such that a hydraulic pressure of the wheel brake becomes a target hydraulic pressure", "a controller includes: a target fluid amount calculator 31 that obtains a target fluid amount of the wheel brake by using a target hydraulic pressure set by a target wheel brake pressure setter 30; an actual fluid amount calculator 32 that obtains an actual fluid amount of the wheel brake by using a hydraulic pressure detected by a brake hydraulic pressure detector; and a target flow rate calculator 34 that obtains a target flow rate of the wheel brake by using the target fluid amount obtained by the target fluid amount calculator 31 and the actual fluid amount obtained by the actual fluid amount calculator 32, and controls the operation of the hydraulic pressure control unit by using the target flow rate obtained by the target flow rate calculator 34".

Specifically, in the patent document, the target fluid amount calculator 31 and the actual fluid amount calculator 32 calculate the fluid amount in accordance with the hydraulic pressure such that the flow rate increases as the hydraulic pressure increases in accordance with a preset map (see FIG. 3). A feedforward term is obtained by differentiating the target fluid amount, and a feedback term is calculated by using a fluid amount difference obtained by subtracting the actual fluid amount from the target fluid amount. Then, the feedforward term and the feedback term are added to calculate the target flow rate, and a control mode is determined by using the target flow rate. An electromagnetic valve (regulator valve 7, inlet valve 9 or outlet valve 14), and an electric motor are controlled by using the control mode.

SUMMARY OF INVENTION

Technical Problem

An object of the disclosure is to provide a brake control device for a vehicle in which brake hydraulic pressures of front and rear wheels are individually adjusted by a plurality of pressure adjustment valves provided in series in a reflux path of a brake fluid, and mutual interference of the brake hydraulic pressures of the front and rear wheels can be prevented.

Solution to Problem

A brake control device for a vehicle according to the disclosure is applied to a vehicle including a regenerative generator connected to a front wheel of the vehicle. The brake control device includes: a pressure adjustment unit including an electric pump, a first pressure adjustment valve, and a second pressure adjustment valve, in which the first pressure adjustment valve is provided in a reflux path of a brake fluid including the electric pump, configured to adjust a pressure of the brake fluid discharged by the electric pump to a first hydraulic pressure, and configured to adjust a rear wheel hydraulic pressure in a rear wheel cylinder provided with a rear wheel of the vehicle to the first hydraulic pressure, and the second pressure adjustment valve is provided in the reflux path, configured to reduce the first hydraulic pressure to a second hydraulic pressure, and configured to adjust a front wheel hydraulic pressure in a front wheel cylinder provided with the front wheel to the second hydraulic pressure; and a controller configured to control the electric pump, the first pressure adjustment valve, and the second pressure adjustment valve.

In the brake control device for a vehicle according to the disclosure, the controller is configured to calculate a front wheel flow rate to increase the front wheel hydraulic pressure by using an operation amount of a brake operation member of the vehicle and a regeneration amount of the regenerative generator, and control the first pressure adjustment valve by using the front wheel flow rate. In the brake control device for a vehicle, the controller is configured to calculate a rear wheel flow rate required to increase the rear wheel hydraulic pressure by using the operation amount and the regeneration amount, and control the electric pump by using the front wheel flow rate and the rear wheel flow rate.

The brake control device for a vehicle according to the disclosure is applied to a vehicle including a regenerative generator connected to a rear wheel of the vehicle. The brake control device includes: a pressure adjustment unit including an electric pump, a first pressure adjustment valve, and a second pressure adjustment valve, in which the first pressure adjustment valve is provided in a reflux path of a brake fluid including the electric pump, configured to adjust a pressure of the brake fluid discharged by the electric pump to a first hydraulic pressure, and configured to adjust a front wheel hydraulic pressure of a front wheel cylinder provided with a front wheel of the vehicle to the first hydraulic pressure, and the second pressure adjustment valve is provided in the reflux path, configured to reduce the first hydraulic pressure to a second hydraulic pressure, and configured to adjust a rear wheel hydraulic pressure to a rear wheel cylinder provided with the rear wheel to the second hydraulic pressure; and a controller configured to control the electric pump, the first pressure adjustment valve, and the second pressure adjustment valve.

In the brake control device for a vehicle according to the disclosure, the controller is configured to calculate a rear wheel flow rate to increase the rear wheel hydraulic pressure by using an operation amount of a brake operation member of the vehicle and a regeneration amount of the regenerative generator, and control the first pressure adjustment valve by using the rear wheel flow rate. In the brake control device for a vehicle, the controller is configured to calculate a front wheel flow rate to increase the front wheel hydraulic pressure by using the operation amount and the regeneration amount, and control the electric pump by using the front wheel flow rate and the rear wheel flow rate.

According to the above configuration, the first pressure adjustment valve is controlled by using a flow rate (the front wheel flow rate or the rear wheel flow rate) required on a downstream side thereof. That is, in a control over the first pressure adjustment valve, the flow rate to be flowed through the first pressure adjustment valve is taken into consideration, so that a valve opening amount of the first pressure adjustment valve is determined. Therefore, even if the second hydraulic pressure downstream of the first pressure adjustment valve is adjusted, a variation (hydraulic pressure interference) in the first hydraulic pressure provided upstream is prevented.

DESCRIPTION OF EMBODIMENTS

<Reference Sign of Component and the Like, and Subscript at End of Reference Sign>

In the following description, components, calculation processing, signals, characteristics, and values denoted by the same reference signs, such as "ECU", have the same functions. Subscripts "i" to "l" appended to ends of reference signs related to wheels are comprehensive reference signs indicating which wheel the reference sign is related to. Specifically, "i" indicates a right front wheel, "j" indicates a left front wheel, "k" indicates a right rear wheel, and "l" indicates a left rear wheel. For example, among four wheel cylinders, a right front wheel cylinder is denoted as CWi, a left front wheel cylinder is denoted as CWj, a right rear wheel cylinder is denoted as CWk, and a left rear wheel cylinder is denoted as CWl. Further, the subscripts "i" to "l" at the ends of the reference signs may be omitted. When the subscripts "i" to "l" are omitted, a reference sign indicates a general term for four wheels. For example, "WH" indicates each wheel and "CW" indicates each wheel cylinder.

Subscripts "f" and "r" attached to ends of reference signs related to a brake system are comprehensive reference signs indicating which system of front and rear wheels the reference sign is related to. Specifically, "f" indicates a front wheel system and "r" indicates a rear wheel system. For example, among wheel cylinders CW of the wheels, front wheel cylinders are denoted as CWf (=CWi, CWj) and rear wheel cylinders are denoted as CWr (=CWk, CWl). Further, the subscripts "f" and "r" at the ends of the reference signs may be omitted. When the subscripts "f" and "r" are omitted, a reference sign indicates a general term for the two brake systems. For example, "CW" indicates wheel cylinders in the front and rear brake systems.

In a fluid passage, a side close to a reservoir RV (a side away from a wheel cylinder CW) is referred to as an "upper portion", and a side close to the wheel cylinder CW (a side away from the reservoir RV) is referred to as a "lower portion". In addition, in a reflux (A) of a brake fluid BF, a side close to a discharge portion of a fluid pump HP is referred to as an "upstream side" and a side away from the discharge portion is referred to as a "downstream side".
<Brake Control Device SC According to First Embodiment>

Figure 1:
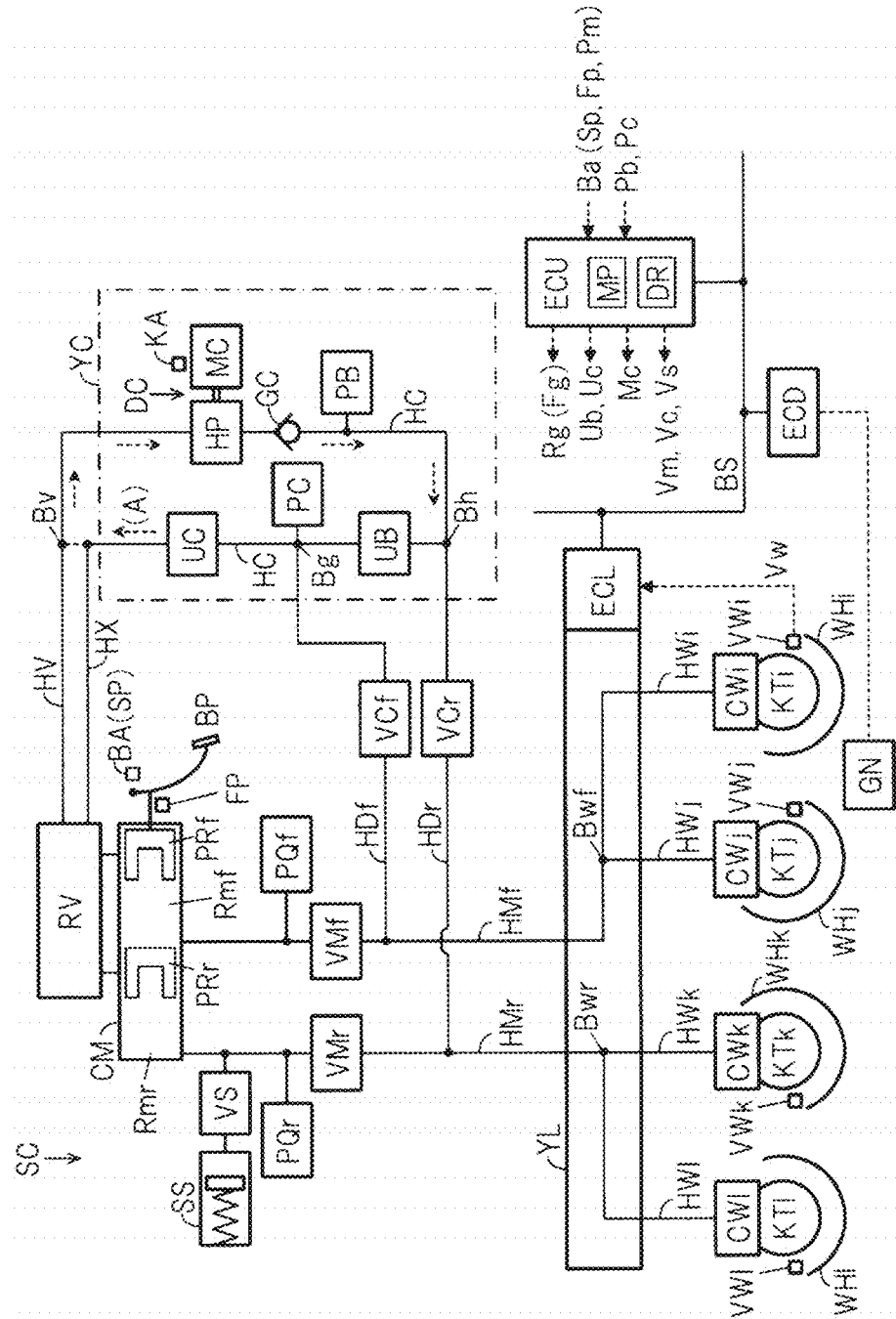
FIG. 1 is an overall configuration diagram illustrating a brake control device SC for a vehicle according to a first embodiment of the disclosure.

A brake control device SC according to a first embodiment of the disclosure will be described with reference to an overall configuration diagram in FIG. 1. In the first embodi-ment, a so-called front and rear type fluid passage is adopted as a two-system fluid passage. Here, the fluid passage is a passage for movement of the brake fluid BF which is a working liquid of the brake control device SC, and corresponds to a brake pipe, a flow path of a fluid unit, a hose, and the like.

A vehicle is a hybrid vehicle or an electric automobile including an electric motor GN for driving. The electric motor GN for driving also functions as an energy regeneration generator (power generator). For example, the generator GN is provided at front wheels WHi and WHj (=WHf). The vehicle includes a brake operation member BP, a wheel cylinder CW, a reservoir RV, a master cylinder CM, a lower portion fluid unit YL, and a wheel speed sensor VW.

The brake operation member (for example, a brake pedal) BP is a member operated by a driver to decelerate the vehicle. The brake operation member BP is operated to adjust a brake torque of the wheel WH and generate a brake force at the wheel WH. Specifically, a rotation member (for example, a brake disk) KT is fixed to the wheel WH of the vehicle. A brake caliper is provided to sandwich the rotation member KT.

The brake caliper is provided with the wheel cylinder CW. A pressure (brake hydraulic pressure) Pw of the brake fluid BF in the wheel cylinder CW is increased to press a friction member (for example, a brake pad) against the rotation member KT. Since the rotation member KT and the wheel WH are fixed to rotate integrally, a friction force generated at this time causes a brake torque (friction brake force) at the wheel WH.

The reservoir (atmospheric pressure reservoir) RV is a working liquid tank, and the brake fluid BF is stored in the tank. The master cylinder CM is mechanically connected to the brake operation member BP via a brake rod or the like. A tandem type master cylinder CM is adopted as the master cylinder CM. When the brake operation member BP is not operated, the master cylinder CM and the reservoir RV are in communication with each other. When the brake operation member BP is operated, a piston PR in the master cylinder CM is pushed and advanced. Accordingly, front wheel and rear wheel master cylinder chambers Rmf and Rmr formed by an inner wall of the master cylinder CM and first and second master pistons PR1 and PR2 are cut off from the reservoir RV. When the operation of the brake operation member BP is increased, a volume of a master cylinder chamber Rm reduces, and the brake fluid BF is pumped from the master cylinder CM.

Front wheel and rear wheel master cylinder fluid passages HMf and HMr are connected to the master cylinder CM. Wheel cylinder fluid passages HWi to HWl are connected to wheel cylinders CWi to CWl. The master cylinder fluid passage HM is branched into the wheel cylinder fluid passage HW at a portion Bw in the lower portion fluid unit YL. Therefore, the front wheel master cylinder chamber Rmf is connected to the wheel cylinders CWi and CWj (=CWf), and the rear wheel master cylinder chamber Rmr is connected to the wheel cylinders CWk and CWl (=CWr).

The lower portion fluid unit YL is a known fluid unit for executing anti-skid control, vehicle stabilization control, and the like. The lower portion fluid unit YL includes an electric pump and a plurality of electromagnetic valves. These components are controlled by a lower portion controller ECL.

The wheel WH is provided with a wheel speed sensor VW so as to detect a wheel speed Vw. A signal of the wheel speed Vw is adopted for the anti-skid control that prevents lock tendency of the wheel WH or the like. The wheel speed Vw detected by the wheel speed sensor VW is input to the lower portion controller ECL. In the controller ECL, a vehicle body speed Vx is calculated by using the wheel speed Vw.

<<Brake Control Device SC>>

The brake control device SC includes an operation amount sensor BA, a stroke simulator SS, a simulator valve VS, a master cylinder valve VM, a pressure adjustment unit YC, and an upper portion controller ECU.

The operation amount sensor BA is provided to detect an operation amount Ba of the brake operation member (brake pedal) BP operated by the driver. At least one of a master cylinder hydraulic pressure sensor PQ that detects a pressure Pm of the master cylinder CM, an operation displacement sensor SP that detects operation displacement Sp of the brake operation member BP, and an operation force sensor FP that detects an operation force Fp of the brake operation member BP is adopted as the brake operation amount sensor BA. That is, at least one of the hydraulic pressure Pm in the master cylinder CM (master cylinder hydraulic pressure), the operation displacement Sp of the brake operation member BP, and the operation force Fp of the brake operation member BP is detected by the operation amount sensor BA as the brake operation amount Ba.

The stroke simulator (also simply referred to as a "simulator") SS is provided to generate the operation force Fp on the brake operation member BP. The simulator SS includes a piston and an elastic body (for example, a compression spring) therein. The brake fluid BF is moved from the master cylinder CM to the simulator SS, and the piston is pushed by the inflowing brake fluid BF. A force is applied to the piston by the elastic body in a direction in which inflow of the brake fluid BF is blocked. The operation force Fp when the brake operation member BP is operated is formed by the elastic body.

The simulator valve VS is provided between the master cylinder chamber Rm and the simulator SS. The simulator valve VS is a two-position electromagnetic valve (also referred to as an "ON-OFF valve") having an ON position (communication state) and an OFF position (cut-off state). A normally OFF electromagnetic valve is adopted as the simulator valve VS. The simulator valve VS is controlled by a drive signal Vs from the controller ECU. When the brake control device SC is activated, the simulator valve VS is set to the ON position, and the master cylinder CM and the simulator SS are set to a communication state. Operation characteristics (a relationship between the operation displacement Sp and the operation force Fp) of the brake operation member BP are formed by the simulator SS. When a volume of the master cylinder chamber Rm is sufficiently large, the simulator valve VS can be omitted.

Front wheel and rear wheel master cylinder valves VMf and VMr are provided in the middle of the front wheel and front wheel master cylinder fluid passages HMf and HMr (between the master cylinder CM and the lower portion fluid unit YL). The master cylinder valve VM is a two-position electromagnetic valve (ON-OFF valve) having an ON position (communication state) and an OFF position (cut-off state). A normally ON electromagnetic valve is adopted as the master cylinder valve VM. The master cylinder valve VM is controlled by a drive signal Vm from the controller ECU. When the brake control device SC is activated (when an activation switch is turned on), the master cylinder valve VM is set to the OFF position, and the master cylinder CM and the wheel cylinder CW are set to the cut-off state (non-communication state). The brake hydraulic pressure Pw is controlled by the pressure adjustment unit YC.

[Pressure Adjustment Unit YC]

The pressure adjustment unit YC includes an electric pump DC, a check valve GC, the first and second pressure adjustment valves UB and UC, and first and second adjustment hydraulic pressure sensors PB and PC. A hydraulic pressure (front wheel brake hydraulic pressure) Pwf of the front wheel cylinder CWf and a hydraulic pressure (rear wheel brake hydraulic pressure) Pwr of the rear wheel cylinder CWr are independently and separately adjusted by the pressure adjustment unit YC. Specifically, the brake hydraulic pressures Pwf of the front wheels WHf provided with the generator GN are independently adjusted within a range equal to or less than the brake hydraulic pressures Pwr of the rear wheels WHr that are not provided with the generator GN.

The electric pump DC includes an electric motor MC and the fluid pump HP, and the fluid pump HP is rotated integrally with the electric motor MC. A suction port of the fluid pump HP is connected to a first reservoir fluid passage HV, and a discharge port of the fluid pump HP is connected to one end portion of a pressure adjustment fluid passage HC. The pressure adjustment fluid passage HC is provided with the check valve GC. The other end portion of the pressure adjustment fluid passage HC is connected to a second reservoir fluid passage HX via the second pressure adjustment valve UC. The first and the second reservoir fluid passages HV and HX are connected to the reservoir RV.

The two pressure adjustment valves UB and UC are provided in series in the pressure adjustment fluid passage HC. Specifically, the first pressure adjustment valve UB is provided in the pressure adjustment fluid passage HC, and the second pressure adjustment valve UC is provided at the other end portion of the pressure adjustment fluid passage HC. An end portion of the second reservoir fluid passage HX is connected to the second pressure adjustment valve UC. That is, the first pressure adjustment valve UB is provided upstream and the second pressure adjustment valve UC is provided downstream. Each of the first and second pressure adjustment valves UB and UC is a linear electromagnetic valve (a proportional valve or a differential pressure valve) in which a valve opening amount (a lift amount) is continuously controlled by using an energization state (for example, a supply current). The first and second pressure adjustment valves UB and UC are controlled by the controller ECU by using drive signals Ub and Uc. Normally ON electromagnetic valves are adopted as the first and second pressure adjustment valves UB and UC.

When the electric pump DC is driven, a reflux (A) of the brake fluid BF is formed to be "HV→HP→GC→UB→UC→HX→RV→HV". That is, the fluid pump HP, the first and second pressure adjustment valves UB and UC, and the reservoir RV are included in the reflux path (A) of the brake fluid BF. The pressure adjustment valve UC may be connected to the first reservoir fluid passage HV at a portion Bv. In this case, the second reservoir fluid passage HX can be omitted, and the reflux path (A) is in an order of "HV→HP→GC→UB→UC→HV".

When the first and second pressure adjustment valves UB and UC are in a fully ON state (when not energized, since the first and second pressure adjustment valves UB and UC are normally ON), both hydraulic pressures (adjustment hydraulic pressures) Pb and Pc in the pressure adjustment fluid passage HC are approximately "0 (atmospheric pressure)". When an energization amount to the first pressure adjustment valve UB is increased and the reflux (A) is squeezed by the pressure adjustment valve UB, in the pressure adjustment fluid passage HC, a hydraulic pressure upstream of the first pressure adjustment valve UB (for example, a hydraulic pressure (first adjustment hydraulic pressure) Pb (corresponding to a first hydraulic pressure) between the fluid pump HP and the first pressure adjustment valve UB) is increased from "0". When an energization amount to the second pressure adjustment valve UC is increased and the reflux (A) is squeezed by the pressure adjustment valve UC, in the pressure adjustment fluid passage HC, a hydraulic pressure upstream of the second pressure adjustment valve UC (for example, a hydraulic pressure (second adjustment hydraulic pressure) Pc (corresponding to a second hydraulic pressure) between the first pressure adjustment valve UB and the second pressure adjustment valve UC) is increased from "0".

Since the first and second pressure adjustment valves UB and UC are provided in series in the pressure adjustment fluid passage HC, the second adjustment hydraulic pressure Pc adjusted by the second pressure adjustment valve UC is equal to or less than the first adjustment hydraulic pressure Pb. The first adjustment hydraulic pressure Pb (first hydraulic pressure) is adjusted by the first pressure adjustment valve UB, and Pc (second hydraulic pressure) is adjusted by the second pressure adjustment valve UC by reducing from the first adjustment hydraulic pressure Pb. In other words, the second adjustment hydraulic pressure Pc is adjusted by the second pressure adjustment valve UC so as to increase from "0 (atmospheric pressure)", and the first adjustment hydraulic pressure Pb is adjusted by the first pressure adjustment valve UB so as to increase from the second adjustment hydraulic pressure Pc. The pressure adjustment unit YC is provided with the first and second adjustment hydraulic pressure sensors PB and PC so as to detect the first and second adjustment hydraulic pressures Pb and Pc.

The pressure adjustment fluid passage HC is connected to the front wheel and the rear wheel master cylinder fluid passages HMf and HMr via front wheel and rear wheel introduction fluid passages HDf and HDr. Specifically, the rear wheel introduction fluid passage HDr is connected between a portion Bh between the fluid pump HP and the first pressure adjustment valve UB in the pressure adjustment fluid passage HC and a lower portion Bwr of the master cylinder valve VMr in the rear wheel master cylinder fluid passage HMr. The front wheel introduction fluid passage HDf is connected between a portion Bg between the first pressure adjustment valve UB and the second pressure adjustment valve UC in the pressure adjustment fluid passage HC and a lower portion Bwf of the master cylinder valve VMf in the front wheel master cylinder fluid passage HMf. A separation valve VC is provided in the middle of the introduction fluid passage HD. The separation valve VC is a two-position electromagnetic valve (ON-OFF valve) having an ON position and an OFF position. A normally OFF electromagnetic valve is adopted as the separation valve VC. The separation valve VC is controlled by a drive signal Vc from the controller ECU. When the brake control device SC is activated, the separation valve VC is set to the ON position. Therefore, when the brake control device SC is operated, the master cylinder valve VM is set to the OFF position, so the first adjustment hydraulic pressure Pb is introduced (supplied) to the rear wheel cylinder CWr, and the second adjustment hydraulic pressure Pc is supplied to the front wheel cylinder CWf. Accordingly, the rear wheel hydraulic pressure Pwr of the rear wheel cylinder CWr is adjusted by the first adjustment hydraulic pressure Pb, and the front wheel hydraulic pressure Pwf of the front wheel cylinder CWf is adjusted by the second adjustment hydraulic pressure Pc.

The first adjustment hydraulic pressure Pb (the first hydraulic pressure, the hydraulic pressure between the fluid pump HP and the first pressure adjustment valve UB), and the second adjustment hydraulic pressure Pc (the second hydraulic pressure, the hydraulic pressure between the first pressure adjustment valve UB and the second pressure adjustment valve UC) are independently and separately adjusted in a range of "Pb Pc", so that the front wheel hydraulic pressure Pwf and the rear wheel hydraulic pressure Pwr can be individually controlled. Accordingly, a cooperative control (so-called regenerative cooperative control) between friction braking and regenerative braking can be executed after considering a front-rear distribution of a brake force. As a result, deceleration and direction stability of the vehicle are ensured, and sufficient energy can be regenerated.

The upper portion controller (also referred to as the "upper portion electronic control unit") ECU includes a microprocessor MP, an electric circuit board where a drive circuit DR is mounted, and a control algorithm programmed in the microprocessor MP. The electric motor MC and the various electromagnetic valves VM, VS, VC, UB, and UC are controlled by the controller ECU by using the brake operation amount Ba, the vehicle body speed Vx, and the adjustment hydraulic pressures Pb and Pc. Specifically, by using the control algorithm in the microprocessor MP, the drive signals Vm, Vs, Vc, Ub, and Uc for controlling the various electromagnetic valves VM, VS, VC, UB, and UC are calculated. Similarly, a drive signal Mc for controlling the electric motor MC is calculated. Then, by using the drive signals Vm, Vs, Vc, Ub, Uc, and Mc, the electromagnetic valves VM, VS, VC, UB, UC, and the electric motor MC are driven.

The controller ECU is network-connected to another controller (electronic control unit) via an in-vehicle communication bus BS. A regeneration amount Rg is transmitted from the controller ECU to a drive controller ECD so as to execute the regenerative cooperative control. The "regeneration amount Rg" is a state quantity (including Fg and Fx) indicating a magnitude of a regenerative brake force generated by the drive motor GN. The vehicle body speed Vx calculated by the lower portion controller ECL is transmitted to the upper portion controller ECU via the communication bus BS.

The controller ECU is provided with the drive circuit DR so as to drive the electromagnetic valves VM, VS, VC, UB, and UC, and the electric motor MC. A bridge circuit is formed in the drive circuit DR by a switching element (power semiconductor device such as MOS-FET or IGBT) so as to drive the electric motor MC. By using the motor drive signal Mc, an energization state of each switching element is controlled, and output of the electric motor MC is controlled. In addition, in the drive circuit DR, excitation states of the electromagnetic valves VM, VS, VC, UB, and UC are controlled by using the drive signals Vm, Vs, Vc, Ub, and Uc so as to drive the electromagnetic valves VM, VS, VC, UB, and UC.

<Processing Example of Pressure Adjustment Control (Particularly, Drive Processing for Electric Motor MC)>

Figure 2:
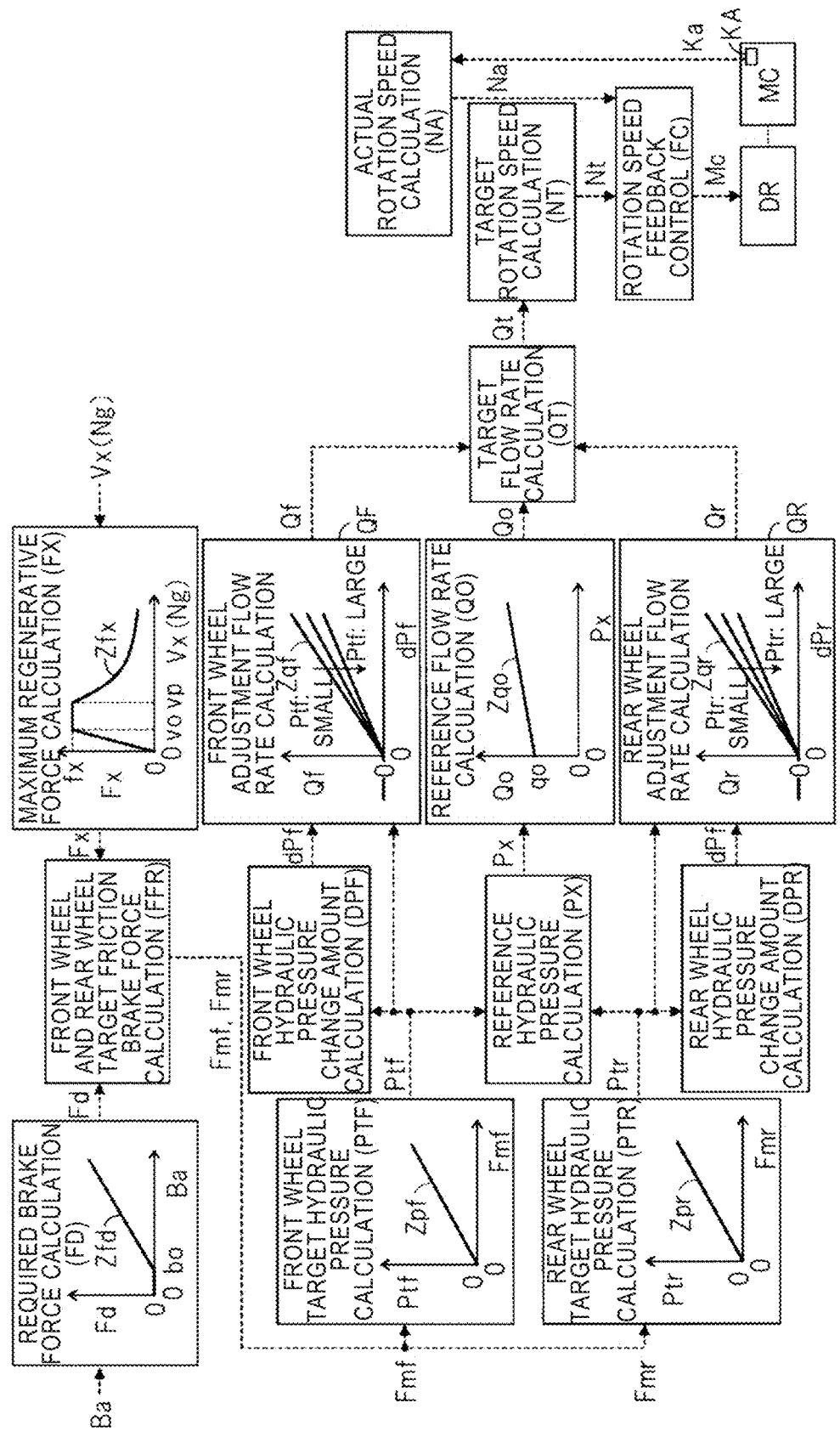
FIG. 2 is a functional block diagram illustrating a processing example of a pressure adjustment control (in particular, drive processing for an electric motor MC).

A processing example of a pressure adjustment control will be described with reference to a functional block diagram in FIG. 2. The pressure adjustment control is a drive control over the electric motor MC and the pressure adjustment valves UB and UC for controlling the adjustment hydraulic pressures Pb and Pc. The hydraulic pressure Pwf of the front wheel cylinder CWf and the hydraulic pressure Pwr of the rear wheel cylinder CWr are individually controlled by the first and second adjustment hydraulic pressures Pb and Pc. An algorithm for the control is programmed in the upper portion controller ECU.

The pressure adjustment control processing includes: a required brake force calculation block FD, a maximum regenerative force calculation block FX, a front wheel and rear wheel target friction brake force calculation block FFR, "front wheel and rear wheel target hydraulic pressure calculation blocks PTF and PTR", "front wheel and rear wheel hydraulic pressure change amount calculation blocks DPF and DPR", a reference hydraulic pressure calculation block PX, a reference flow rate calculation block QO, "front wheel and rear wheel adjustment flow rate calculation blocks QF and QR", a target flow rate calculation block QT, a target rotation speed calculation block NT, an actual rotation speed calculation block NA, and a rotation speed feedback control block NC.

In the required brake force calculation block FD, a required brake force Fd is calculated by using the operation amount Ba and a calculation map Zfd. The required brake force Fd is a target value of a total brake force F acting on the vehicle, and is a brake force obtained by combining "a friction brake force Fm generated by the brake control device SC" and "a regenerative brake force Fg generated by the generator GN". In accordance with the calculation map Zfd, the required brake force Fd is determined to be "0" in a range in which the operation Ba is from "0" to a predetermined value bo, and when the operation amount Ba is equal to or larger than the predetermined value bo, the required brake force Fd is calculated to monotonically increase from "0" as the operation amount Ba increases.

In the maximum regenerative force calculation block FX, a maximum value of the regenerative brake force (referred to as the "maximum regenerative force") Fx (corresponding to "regeneration amount") is calculated by using the vehicle body speed Vx and a calculation map Zfx. A regeneration amount of the generator GN is limited by specifications of a power transistor (such as IGBT) of a drive controller ECD and charging acceptability of a battery. For example, the regeneration amount of the generator GN is controlled to be predetermined electric power (electrical energy per unit time). Since the electric power (power) is constant, a regenerative torque around a wheel axis generated by the generator GN is inversely proportional to a rotation speed of the wheel WH (that is, the vehicle body speed Vx). When a rotation speed Ng of the generator GN is reduced, the regeneration amount is reduced. Further, the regeneration amount has an upper limit value.

In the calculation map Zfx for the maximum regenerative force Fx, the maximum regenerative force Fx (regeneration amount) is set to increase in accordance with an increase in the vehicle body speed Vx in a range in which the vehicle body speed Vx is equal to or larger than "0" and less than a first predetermined speed vo. The maximum regenerative force Fx is determined to be an upper limit value fx in a range in which the vehicle body speed Vx is equal to or larger than the first predetermined speed vo and less than a second predetermined speed vp. The maximum regenerative force Fx is set to reduce in accordance with an increase in the vehicle body speed Vx when the vehicle body speed Vx is equal to or larger than the second predetermined speed vp. For example, in a reduction characteristic of the maximum regenerative force Fx (a characteristic when "Vx≥vp"), a relationship between the vehicle body speed Vx and the maximum regenerative force Fx is represented by a hyperbola (that is, a regenerative electric power is constant). Here, each of the predetermined values vo and vp is a preset constant. In the calculation map Zfx, the rotation speed Ng of the generator GN may be adopted instead of the vehicle body speed Vx.

In the front wheel and rear wheel target friction brake force calculation block FFR, front wheel and rear wheel target friction brake forces Fmf and Fmr are calculated by using the required brake force Fd and the maximum regenerative force Fx. The front wheel and rear wheel target friction brake forces Fmf and Fmr are target values of target friction brake forces Fmf and Fmr of the front wheel and rear wheel. First, in the front wheel and rear wheel target friction brake force calculation block FFR, a brake force distribution ratio (in particular, a ratio of a rear wheel brake force to a total brake force F, which is referred to as a "rear wheel ratio Hr") is set, for example, the rear wheel ratio Hr can be determined as a preset constant (predetermined value) hr. In addition, the rear wheel ratio Hr can be determined by using at least one of a turning state quantity Ta, the vehicle body speed Vx, and the required brake force Fd. Here, the turning state quantity Ta is a variable indicating a turning state of the vehicle, and corresponds to, for example, a yaw rate and a lateral acceleration.

Next, in the front wheel and rear wheel target friction brake force calculation block FFR, it is determined "whether the required brake force Fd is equal to or less than the maximum regenerative force Fx" by using the required brake force Fd and the maximum regenerative force Fx. That is, it is determined whether a brake force Fd required by the driver can be achieved by the regenerative brake force only. When "Fd Fx", the target regenerative brake force Fg (corresponding to the "regeneration amount") is determined to match the required brake force Fd, and the target friction brake forces Fmf and Fmr of the front wheel and rear wheel are calculated to be "0" (that is, "Fg=Fd, Fmf=Fmr=0"). That is, when the regenerative brake force Fg does not reach the maximum regenerative force Fx (when "Fg<Fx"), in order to decelerate the vehicle, the required brake force Fd is achieved by the regenerative braking only without adopting the friction braking.

On the other hand, when "Fd>Fx", the target regenerative brake force Fg (regeneration amount), a complementary brake force Fh, and a rear wheel reference force Fs are calculated. The regenerative brake force Fg is calculated by using the maximum regenerative force Fx. Specifically, the regenerative brake force Fg is calculated to match the maximum regenerative force Fx. That is, when the regenerative brake force Fg reaches the maximum regenerative force Fx (when "Fg≥Fx"), "Fg=Fx" is calculated, and regenerative energy is maximized. The rear wheel reference force Fs is calculated by using the required brake force Fd and the rear wheel ratio Hr. The rear wheel reference force Fs is a value obtained by taking a brake force front-rear ratio with respect to the required brake force Fd (that is, the rear wheel ratio Hr) into consideration, and is used as a reference for achieving the rear wheel ratio Hr. Specifically, the rear wheel ratio Hr is multiplied by the required brake force Fd to calculate the rear wheel reference force Fs (that is, "Fs=Hr× Fd"). The complementary brake force Fh is calculated by using the required brake force Fd and the maximum regenerative force Fx. The complementary brake force Fh is a brake force to be complemented by the friction braking to achieve the required brake force Fd. Specifically, the maximum regenerative force Fx is subtracted from the required brake force Fd to calculate the complementary brake force Fh (that is, "Fh=Fd−Fx").

Then, the complementary brake force Fh and the rear wheel reference force Fs are compared with each other, and it is determined whether "the complementary brake force Fh is equal to or less than the rear wheel reference force Fs". When "Fh≤Fs", the front wheel target friction brake force Fmf is determined to be "0", and the rear wheel target friction brake force Fmr is calculated to match the complementary brake force Fh (that is, "Fmf=0, Fmr=Fh"). That is, when the complementary brake force Fh is equal to or less than the rear wheel reference force Fs, no friction brake force is generated on the front wheel WHf, and only the regenerative brake force Fg is applied. Then, a friction brake force is generated on the rear wheel WHr so as to satisfy the required brake force Fd.

On the other hand, when "Fh>Fs", the rear wheel target friction brake force Fmr is calculated to match the rear wheel reference force Fs, and the front wheel target friction brake force Fmf is calculated to match a value (referred to as "front wheel indicating force") Fc obtained by subtracting the rear wheel reference force Fs from the complementary brake force Fh (that is, "Fmf=Fc=Fh−Fs, Fmr=Fs"). When the complementary brake force Fh is larger than the rear wheel reference force Fs, the rear wheel target friction brake force Fmr is set to the rear wheel reference force Fs inconsideration of the rear wheel ratio Hr, and a shortage thereof (=Fc) with respect to the required brake force Fd is determined as the front wheel target friction brake force Fmf. In the front wheel and rear wheel target friction brake force calculation block FFR, the regeneration amount Rg is calculated by using the regenerative brake force Fg. The regeneration amount Rg is a target value of the regeneration amount of the generator GN. The regeneration amount Rg is transmitted from the upper portion controller ECU to the drive controller ECD via the communication bus BS. The regenerative brake force Fg (corresponding to "regeneration amount") may be transmitted as it is as the regeneration amount Rg.

In the front wheel target hydraulic pressure calculation block PTF, a front wheel target hydraulic pressure Ptf is calculated by using the front wheel target friction brake force Fmf and a calculation map Zpf. The front wheel target hydraulic pressure Ptf is a target value of the second adjustment hydraulic pressure Pc adjusted by the pressure adjustment unit YC. The front wheel target hydraulic pressure Ptf is determined to monotonically increase from "0" as the front wheel target friction brake force Fmf increases from "0" in accordance with the calculation map Zpf. Similarly, in the rear wheel target hydraulic pressure calculation block PTR, a rear wheel target hydraulic pressure Ptr is calculated by using the rear wheel target friction brake force Fmr and a calculation map Zpr. The rear wheel target hydraulic pressure Ptr is a target value of the first adjustment hydraulic pressure Pb adjusted by the pressure adjustment unit YC. The rear wheel target hydraulic pressure Ptr is determined to monotonically increase from "0" as the rear wheel target friction brake force Fmr increases from "0" in accordance with the calculation map Zpr.

In the front wheel hydraulic pressure change amount calculation block DPF, a front wheel hydraulic pressure change amount dPf is calculated by using the front wheel target hydraulic pressure Ptf. Specifically, the front wheel target hydraulic pressure Ptf is time-differentiated to determine the front wheel hydraulic pressure change amount dPf. The front wheel hydraulic pressure change amount dPf is calculated to increase as an operation speed dB (a time change amount of the operation amount Ba) of the brake operation member BP increases. Similarly, in the rear wheel hydraulic pressure change amount calculation block DPR, a rear wheel hydraulic pressure change amount dPr is calculated by using the rear wheel target hydraulic pressure Ptr. That is, the rear wheel target hydraulic pressure Ptr is time-differentiated to determine the rear wheel hydraulic pressure change amount dPr. The rear wheel hydraulic pressure change amount dPr is calculated to increase as the operation speed dB (the time change amount of the operation amount Ba) of the brake operation member BP increases.

In the reference hydraulic pressure calculation block PX, the rear wheel target hydraulic pressure Ptr is determined to be a reference hydraulic pressure Px (that is, "Px=Ptr"). Since the first pressure adjustment valve UB is provided upstream of the second pressure adjustment valve UC, "Ptf>Ptr" is not satisfied. In the reference flow rate calculation block QO, a reference flow rate Qo is calculated by using the reference hydraulic pressure Px and a calculation map Zqo. The reference flow rate Qo is a target value of a discharge amount (flow rate) of the electric pump DC, which is a minimum limit necessary for adjusting the hydraulic pressure by an orifice effect of the first and second pressure adjustment valves UB and UC. The reference flow rate Qo is calculated to monotonically increase from a predetermined flow rate qo as the reference hydraulic pressure Px increases from "0" in accordance with the calculation map Zqo so as to compensate for an internal leakage of the fluid pump HP. The predetermined flow rate qo is a preset constant.

In the front wheel adjustment flow rate calculation block QF, a front wheel adjustment flow rate Qf (corresponding to "front wheel flow rate") is calculated by using the front wheel hydraulic pressure change amount dPf, the front wheel target hydraulic pressure Ptf, and a calculation map Zqf. The front wheel adjustment flow rate Qf is a target value of a discharge flow rate of the electric pump DC which is required to increase the front wheel brake hydraulic pressure Pwf (=Pc, corresponding to the "front wheel hydraulic pressure"). That is, the front wheel adjustment flow rate Qf is a target value of a flow rate (volume per unit time) to be flowed into the front wheel cylinder CWf. In accordance with the calculation map Zqf, the front wheel adjustment flow rate Qf (front wheel flow rate) is calculated to be "0" when the front wheel hydraulic pressure change amount dPf is equal to or less than "0", and is determined to monotonically increase from "0" as the front wheel hydraulic pressure change amount dPf increases from "0". It is determined that the larger the front wheel hydraulic pressure change amount dPf, the larger the front wheel adjustment flow rate Qf such that a large amount of brake fluid BF is supplied to the front wheel cylinder CWf. When "dPf=0 (when the brake operation member BP is held)" or "dPf<0 (when the brake operation member BP is returned)", the front wheel adjustment flow rate Qf is set to "0".

Similarly, in the rear wheel adjustment flow rate calculation block QR, a rear wheel adjustment flow rate Qr (corresponding to the "rear wheel flow rate") is calculated by using the rear wheel hydraulic pressure change amount dPr, the rear wheel target hydraulic pressure Ptr, and a calculation map Zqr. The rear wheel adjustment flow rate Qr is a target value of a discharge flow rate of the electric pump DC which is required to increase the rear wheel brake hydraulic pressure Pwr (=Pb, corresponding to the "rear wheel hydraulic pressure"). That is, the rear wheel adjustment flow rate Qr is a target value of a flow rate (volume per unit time) to be flowed into the rear wheel cylinder CWr. In accordance with the calculation map Zqr, the rear wheel adjustment flow rate Qr (rear wheel flow rate) is calculated to be "0" when the rear wheel hydraulic pressure change amount dPr is equal to or less than "0", and is determined to monotonically increase from "0" as the rear wheel hydraulic pressure change amount dPr increases from "0". When "dPr=0 (when the brake operation member BP is held)" or "dPr<0 (when the brake operation member BP is returned)", the rear wheel adjustment flow rate Qr is set to "0".

In the front wheel and rear wheel adjustment flow rate calculation blocks QF and QR, it is determined the smaller the front wheel and rear wheel target hydraulic pressures Ptf and Ptr, the larger the front wheel and rear wheel adjustment flow rates Qf and Qr, and the larger the front wheel and rear wheel target hydraulic pressures Ptf and Ptr, the smaller the front wheel and rear wheel adjustment flow rates Qf and Qr. It is by using that the front wheel and rear wheel brake hydraulic pressures Pwf and Pwr increase according to rigidity (non-linear spring constant) of the brake caliper, a friction material, and the like. That is, a large amount of flow rate is required when the front wheel and rear wheel brake hydraulic pressures Pwf and Pwr are low, while the flow rate is not required to be so large when the front wheel and rear wheel brake hydraulic pressures Pwf and Pwr are high.

In the target flow rate calculation block QT, a target flow rate Qt is calculated by using the reference flow rate Qo and the front wheel and rear wheel adjustment flow rates Qf and Qr. The target flow rate Qt is a target value of a discharge flow rate of the electric pump DC (that is, the fluid pump HP). Specifically, the target flow rate Qt is determined by adding up the reference flow rate Qo and the front wheel and rear wheel adjustment flow rates Qf and Qr (that is, "Qt=Qo+Qf+Qr").

In the rotation speed feedback control block NC, a rotation speed feedback control over the electric motor MC is executed by using a target rotation speed Nt and an actual rotation speed Na. That is, the drive signal Mc is determined such that the actual rotation speed Na approaches and finally matches the target rotation speed Nt. By using the drive signal Mc, a switching element of the drive circuit DR is driven and the electric motor MC is controlled.

When at least one of the front wheel and rear wheel hydraulic pressure change amounts dPf and dPr is larger than "0", a sum of the front wheel and rear wheel adjustment flow rates Qf and Qr ("Qf+Qr", which is referred to as a "total flow rate") is calculated to be larger than "0". Then, it is determined that the larger the front wheel and rear wheel hydraulic pressure change amounts dPf and dPr (for example, when the brake operation member BP is suddenly operated and a sudden pressure increase is required), the larger the total flow rate (Qf+Qr) of the front wheel and rear wheel adjustment flow rates Qf and Qr, and the target rotation speed Nt is calculated to be larger. That is, in accordance with a pressure increase gradient of the brake hydraulic pressure Pw, the target rotation speed Nt (as a result, the actual rotation speed Na) of the electric pump DC is increased, and the discharge flow rate thereof is increased. On the other hand, "when the first and second adjustment hydraulic pressures Pb and Pc are maintained constant" and "when the first and second adjustment hydraulic pressures Pb and Pc are reduced", the reference flow rate Qo is sufficient for the discharge flow rate of the electric pump DC. In these cases, the total flow rate (Qf+Qr) is calculated to be "0", and the increased target rotation speed Nt is reduced.

The electric pump DC (in particular, the fluid pump HP) does not discharge at any unnecessary flow rate, and the discharge flow rate of the electric pump DC is increased only when necessary. Therefore, the brake control device SC can be power saving while pressure-rise responsiveness of the brake hydraulic pressure Pw is ensured. The front wheel and rear wheel target hydraulic pressures Ptf and Ptr are calculated according to the operation amount Ba or the front wheel and rear wheel target friction brake forces Fmf and Fmr. Therefore, the front wheel and rear wheel adjustment flow rates Qf and Qr (as a result, the total flow rate "Qf+Qr") can be calculated by using a time differential value (operation speed) dB of the operation amount Ba and time differential values (brake force change amounts) dFf and dFr of the front wheel and rear wheel target friction brake forces Fmf and Fmr.

In the above description, when both the front wheel and rear wheel hydraulic pressure change amounts dPf and dPr are equal to or less than "0" (that is, when the brake operation member BP is held or returned), the target flow rate Qt is determined to be the reference flow rate Qo. Since the pressure adjustment unit YC is provided with the check valve GC, when the first and second pressure adjustment valves UB and UC are completely OFF, the adjustment hydraulic pressures Pb and Pc can be kept constant. In addition, when the pressure adjustment valves UB and UC are slightly ON, the adjustment hydraulic pressures Pb and Pc can be gradually reduced. Therefore, when "dPf≤0 and dPr≤0", "Qo=0", and the target flow rate Qt is determined to be "0". Then, rotation of the electric pump DC (=MC) is stopped (that is, "Nt=0"). When the brake operation member BP is held or returned, the electric motor MC is stopped, and thereby further power saving can be achieved. When the brake hydraulic pressure Pw is increased from the state where the electric motor MC is stopped, the target flow rate Qt is determined to be the sum (total flow rate) of the front wheel and rear wheel adjustment flow rates Qf and Qr (that is, "Qt=Qf+Qr").

<Drive Processing for First and Second Pressure Adjustment Valves UB and UC>

Figure 3:
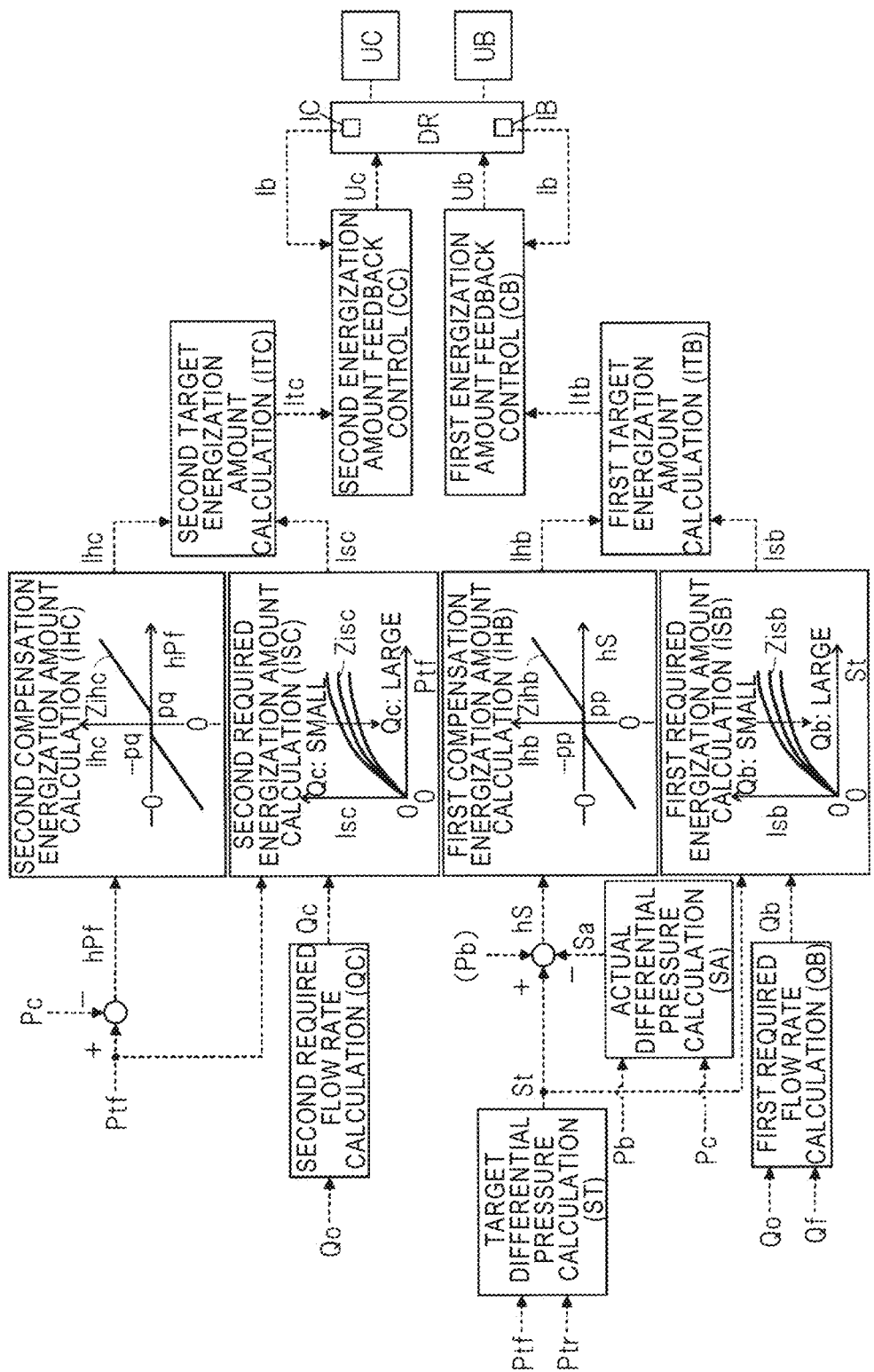
FIG. 3 is a functional block diagram illustrating drive processing for first and second pressure adjustment valves UB and UC.

Drive processing for the first and second pressure adjustment valves UB and UC in the pressure adjustment control will be described with reference to a functional block diagram in FIG. 3. The processing includes: a target differential pressure calculation block ST, an actual differential pressure calculation block SA, "first and second required flow rate calculation blocks QB and QC", "first and second required energization amount calculation blocks ISB and ISC", "first and second compensation energization amount calculation blocks IHB and IHC", "first and second target energization amount calculation blocks ITB and ITC", and "first and second energization amount feedback control blocks CB and CC".

In the target differential pressure calculation block ST, a target differential pressure St is calculated by using the front wheel target hydraulic pressure Ptf and the rear wheel target hydraulic pressure Ptr. The target differential pressure St is a target value of a hydraulic pressure difference between the first adjustment hydraulic pressure Pb and the second adjustment hydraulic pressure Pc. Specifically, the front wheel target hydraulic pressure Ptf is subtracted from the rear wheel target hydraulic pressure Ptr to determine the target differential pressure St (that is, "St=Ptr−Ptf"). In the actual differential pressure calculation block SA, an actual differential pressure Sa is calculated by using the first adjustment hydraulic pressure Pb and the second adjustment hydraulic pressure Pc. The actual differential pressure Sa is an actual hydraulic pressure difference between the first adjustment hydraulic pressure Pb and the second adjustment hydraulic pressure Pc and corresponds to the target differential pressure St. The actual differential pressure Sa is determined by subtracting the second adjustment hydraulic pressure Pc (a value detected by the second adjustment hydraulic pressure sensor PC) from the first adjustment hydraulic pressure Pb (a value detected by the first adjustment hydraulic pressure sensor PB) (that is, "Sa=Pb−Pc"). When a mass cylinder hydraulic pressure sensor PQ is used instead of the second adjustment hydraulic pressure sensor PC, the actual differential pressure Sa is calculated to be "Sa=Pb−Pm".

In the first required flow rate calculation block QB, a first required flow rate Qb is calculated by using the reference flow rate Qo and the front wheel adjustment flow rate Qf. The first required flow rate Qb is a target value of a flow rate required for the first pressure adjustment valve UB. Specifically, the first required flow rate Qb (the target value of the flow rate passing through the first pressure adjustment valve UB) is calculated by adding up the reference flow rate Qo and the front wheel adjustment flow rate Qf (that is, "Qb=Qo+Qf"). That is, the rear wheel adjustment flow rate Qr is supplied to the rear wheel cylinder CWr, and the first required flow rate Qb including the front wheel adjustment flow rate Qf is flowed to the first pressure adjustment valve UB.

Similarly, in the second required flow rate calculation block QC, a second required flow rate Qc is calculated by using the reference flow rate Qo. The second required flow rate Qc is a target value of a flow rate required for the second pressure adjustment valve UC. Specifically, the reference flow rate Qo is calculated as it is as the second required flow rate Qc (that is, "Qc=Qo"). That is, the front wheel adjustment flow rate Qf is supplied to the front wheel cylinder CWf, and the second required flow rate Qc (=Qo) is flowed to the second pressure adjustment valve UC.

In the first required energization amount calculation block ISB, a first required energization amount Isb is calculated by using the target differential pressure St, the first required flow rate Qb, and a calculation map Zisb. The first required energization amount Isb is a target value of an energization amount (current) supplied to the first pressure adjustment valve UB. The first required energization amount Isb is determined to monotonically increase from "0" with an "upward protruding" characteristic as the target differential pressure St increases from "0" in accordance with the calculation map Zisb. In addition, in accordance with the calculation map Zisb, the first required energization amount Isb is determined to be larger as the first required flow rate Qb is smaller, and to be smaller as the first required flow rate Qb is larger. Since the first pressure adjustment valve UB is normally ON, as the first required flow rate Qb is larger, the first required energization amount Isb is calculated to be smaller, and the valve opening amount of the first pressure adjustment valve UB is increased.

Similarly, in the second required energization amount calculation block ISC, a second required energization amount Isc is calculated by using the front wheel target hydraulic pressure Ptf, a second required flow rate Qc, and a calculation map Zisc. The second required energization amount Isc is a target value of an energization amount (current) supplied to the second pressure adjustment valve UC. The second required energization amount Isc is determined to monotonically increase from "0" with an "upward protruding" characteristic as the front wheel target hydraulic pressure Ptf increases from "0" in accordance with the calculation map Zisc. Similar to the first pressure adjustment valve UB, the second required energization amount Isc is determined to be larger as the second required flow rate Qc is smaller, and to be smaller as the second required flow rate Qc is larger.

In the first compensation energization amount calculation block IHB, a first compensation energization amount Ihb is calculated by using a deviation hS between the target differential pressure St and the actual differential pressure Sa, and a calculation map Zihb. The first compensation energization amount Ihb is a target value of an energization amount (current) supplied to the first pressure adjustment valve UB for matching the actual differential pressure Sa with the target differential pressure St. The actual differential pressure Sa is subtracted from the target differential pressure St to calculate the differential pressure deviation hS (that is, "hS=St−Sa"). When the deviation hS is equal to or less than a predetermined value "−pp" and the deviation hS is equal to or larger than a predetermined value pp, the first compensation energization amount Ihb is determined to increase as the differential pressure deviation hS increases. In addition, in a range where the deviation hS is between the predetermined value "−pp" and the predetermined value pp, the first compensation energization amount Ihb is determined to be "0". Here, the predetermined value pp is a preset positive constant. The differential pressure deviation hS may also be determined by subtracting the first adjustment hydraulic pressure Pb (a value detected by the first adjustment hydraulic pressure sensor PB) from the target differential pressure St (that is, "hS=St−Pb").

Similarly, in the second compensation energization amount calculation block IHC, a second compensation energization amount Ihc is calculated by using a deviation hPf between the front wheel target hydraulic pressure Ptf and the second adjustment hydraulic pressure Pc, and a calculation map Zihc. The second compensation energization amount Ihc is a target value of an energization amount (current) supplied to the second pressure adjustment valve UC for matching the second adjustment hydraulic pressure Pc with the front wheel target hydraulic pressure Ptf. The second adjustment hydraulic pressure Pc (a value detected by the second adjustment hydraulic pressure sensor PC) is subtracted from the front wheel target hydraulic pressure Ptf to calculate the hydraulic pressure deviation hPf (that is, "hPf=Ptf−Pc"). When the deviation hPf is equal to or less than a predetermined value "−pq" and the deviation hPf is equal to or larger than a predetermined value pq, the second compensation energization amount Ihc is determined to increase as the deviation hPf increases. In addition, in a range where the hydraulic pressure deviation hPf is between the predetermined value "−pq" and the predetermined value pq, the second compensation energization amount Ihc is determined to be "0". Here, the predetermined value pq is a preset positive constant.

In the first target energization amount calculation block ITB, a first target energization amount Itb is calculated by using the first required energization amount Isb and the first compensation energization amount Ihb. The first target energization amount Itb is a target value of an energization amount (current) supplied to the first pressure adjustment valve UB. Specifically, the first required energization amount Isb and the first compensation energization amount Ihb are added up to calculate the first target energization amount Itb (that is, "Itb=Isb+Ihb"). Similarly, in the second target energization amount calculation block ITC, a second target energization amount Itc is calculated by using the second required energization amount Isc and the second compensation energization amount Ihc. The second target energization amount Itc is a target value of an energization amount (current) supplied to the second pressure adjustment valve UC. The second target energization amount Itc is determined by adding up the second required energization amount Isc and the second compensation energization amount Ihc (that is, "Itc=Isc+Ihc").

In the first energization amount feedback control block CB, an energization amount feedback control over the first pressure adjustment valve UB is executed by using the first target energization amount Itb and a first actual energization amount Ib. That is, the drive signal Ub is determined such that the first actual energization amount Ib approaches and matches the first target energization amount Itb. Here, the first actual energization amount Ib is detected by a first actual energization amount sensor IB provided in the drive circuit DR. Then, by using the drive signal Ub, the drive circuit DR is driven and the first pressure adjustment valve UB is controlled. Similarly, in the second energization amount feedback control block CC, an energization amount feedback control over the second pressure adjustment valve UC is executed by using the second target energization amount Itc and a second actual energization amount Ic such that the second actual energization amount Ic approaches and matches the second target energization amount Itc. The second actual energization amount Ic is detected by a second actual energization amount sensor IC provided in the drive circuit DR. By using the drive signal Uc calculated by the second energization amount feedback control block CC, the drive circuit DR is driven and the second pressure adjustment valve UC is controlled. As a result, the first and second adjustment hydraulic pressures Pb and Pc are controlled to approach and match the rear wheel and front wheel target hydraulic pressures Ptr and Ptf.

When the required brake force Fd corresponding to the operation amount Ba is equal to or less than the regenerative brake force (the maximum regenerative force) Fx that can be generated by the generator GN, a control is performed such that "Pb=Pc=0", and the friction brake force Fm is not generated. When the operation amount Ba is increased and the regenerative brake force Fg exceeds the maximum regenerative force Fx, the required brake force Fd cannot be achieved for the regenerative brake force Fg. In this case, the friction brake force Fmr of the rear wheel WHr is increased by the first adjustment hydraulic pressure Pb, which corresponds to a shortage (that is, "Fd−Fx") of the regenerative brake force Fg with respect to the required brake force Fd. At this time, "Pc=0" is maintained, only the regenerative brake force is applied to the front wheel WHf, and the friction brake force Fmf is not generated. A ratio (a front wheel ratio) Hf (=1−Hr) of a front wheel brake force to a total brake force F is gradually reduced from 100% when the friction brake force Fmr of the rear wheel WHr is sequentially increased. When the operation amount Ba is further increased and the front wheel ratio Hf reaches a preset predetermined ratio (constant) hf (=1−hr), the second adjustment hydraulic pressure Pc starts to increase from "0". As the second adjustment hydraulic pressure Pc increases, the friction brake force Fmf of the front wheel WHf is increased. Therefore, the regenerative brake force Fg is maintained at the maximum value Fx and front-rear distribution ratios Hf and Hr are maintained at desired values hf and hr.

In other words, the front wheel brake hydraulic pressure (front wheel hydraulic pressure) Pwf and the rear wheel brake hydraulic pressure (rear wheel hydraulic pressure) Pwr are individually adjusted by the first and second adjustment hydraulic pressures Pb and Pc. Specifically, as the operation amount Ba increases, a generation state of the brake force is changed in an order of "only the regenerative brake force Fg of the front wheel WHf generated by the generator GN"→"(the regenerative brake force Fg of the front wheel WHf)+(the friction brake force of the rear wheel WHr generated by the first adjustment hydraulic pressure Pb)"→"(the regenerative brake force Fg of the front wheel Whf)+(the friction brake force of the front wheel WHf generated by the second adjustment hydraulic pressure Pc)+(the friction brake force of the rear wheel WHr)". Accordingly, sufficient regenerative energy can be ensured, and a front-rear distribution of the brake force is appropriate. Therefore, the deceleration and the direction stability of the vehicle can be ensured.

Since the first and second pressure adjustment valves UB and UC are provided in series in the reflux path (A), even if the first adjustment hydraulic pressure Pb provided upstream is maintained constant, a flow rate passing through the first pressure adjustment valve UB changes when the second adjustment hydraulic pressure Pc provided downstream is changed (increased). The first adjustment hydraulic pressure Pb changes due to the hydraulic pressure interference caused by the flow rate change. This hydraulic pressure interference occurs even when the discharge flow rate of the electric pump DC is constant, but is particularly noticeable when the discharge flow rate is increased. For example, such hydraulic pressure interference may occur during a replacement operation of the regenerative cooperative control. The first and second pressure adjustment valves UB and UC are driven and controlled by using the required flow rates (first and second required flow rates) Qb and Qc. That is, a control over the first and second pressure adjustment valves UB and UC is executed taking the flow rates Qb and Qc to be flowed into consideration. In particular, downstream of the first pressure adjustment valve UB provided upstream, the valve opening amount is controlled by using the front wheel adjustment flow rate (flow rate to be supplied to the front wheel cylinder CWf) Qf that is required for increasing the front wheel brake hydraulic pressure Pwf. Therefore, in the hydraulic pressure control, the hydraulic pressure interference can be prevented, and pressure adjustment accuracy can be improved.

Further, the rotation speeds Nt and Na of the electric pump DC are increased only when an increase in the brake hydraulic pressure Pw is required by using the hydraulic pressure change amount dP. As the hydraulic pressure change amount dP increases, the rotation speeds Nt and Na of the electric pump DC increase. Therefore, even when the power saving of the brake control device SC is achieved and the brake operation member BP is suddenly operated, a sufficient fluid amount (volume of the brake fluid BF) is supplied to the wheel cylinder CW, the brake hydraulic pressure Pw is rapidly increased, and responsiveness thereof is ensured. In addition, since a time delay in the hydraulic pressure feedback control by using the deviations hPf and hS is prevented, the pressure adjustment accuracy of the brake hydraulic pressure Pw is improved.

<Brake Control Device SC According to Second Embodiment>

Figure 4:
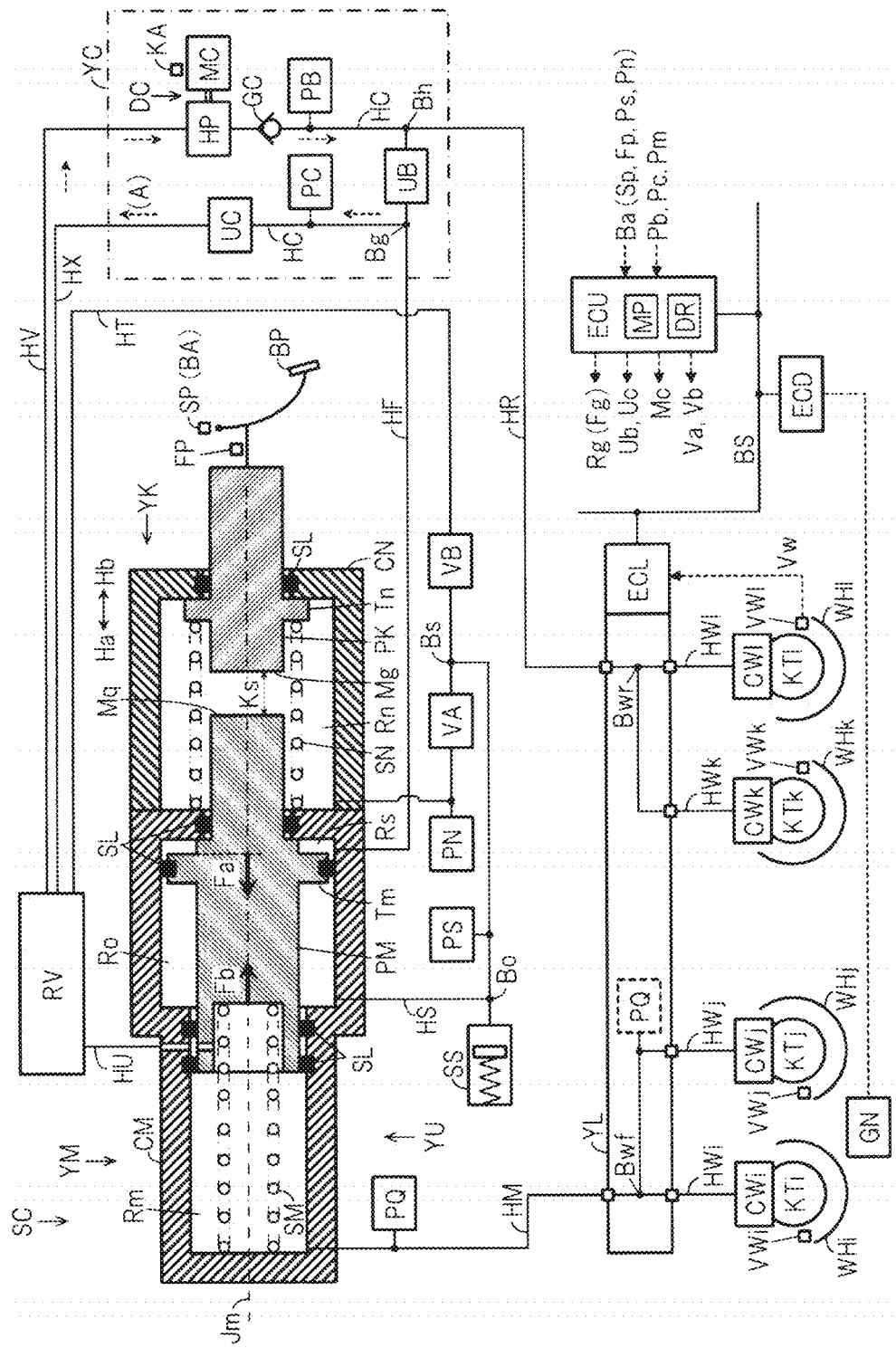
FIG. 4 is an overall configuration diagram illustrating a brake control device SC for a vehicle according to a second embodiment of the disclosure.

A brake control device SC according to a second embodiment of the disclosure will be described with reference to an overall configuration diagram in FIG. 4. In the second embodiment, a front and rear type fluid passage is also adopted as a two-system fluid passage. Similar to the above, components, calculation processing, signals, characteristics, and values denoted by the same reference signs have the same functions. Subscripts "i" to "l" appended to ends of reference signs related to wheels are comprehensive reference signs indicating which wheel the reference signs are related to. Specifically, "i" indicates a right front wheel, "j" indicates a left front wheel, "k" indicates a right rear wheel, and "l" indicates a left rear wheel. The subscripts "i" to "l" at the ends of the reference signs may be omitted. In this case, each reference sign represents a general term for the four wheels. Subscripts "f" and "r" attached to ends of the reference signs related to the front and rear type brake system are comprehensive reference signs indicating which system of front and rear wheels the reference sign is related to. "f" indicates a front wheel system and "r" indicates a rear wheel system. The subscripts "f" and "r" at the ends of the reference signs may be omitted. In this case, a reference sign indicates a general term for the two brake systems. In addition, in a fluid passage, a side away from the wheel cylinder CW is referred to as an "upper portion", and a side close to the wheel cylinder CW is referred to as a "lower portion". In the reflux path (A), a side closer to the discharge portion of the fluid pump HP is referred to as an "upstream side" and a side farther therefrom is referred to as a "downstream side".

<<Brake Control Device SC>>

The brake control device SC according to the second embodiment includes an upper portion fluid unit YU. The upper portion fluid unit YU is controlled by the upper portion controller ECU. Similar to the first embodiment, in the second embodiment, the lower portion fluid unit YL controlled by the lower portion controller ECL is also provided in the vehicle. The upper portion controller ECU and the lower portion controller ECL are connected via the communication bus BS such that signals (such as values detected by sensors and calculation values) are shared.

In the second embodiment, the generator GN is also provided in the front wheel WHf. The upper portion fluid unit YU in the second embodiment includes the operation amount sensor BA, a master unit YM, the pressure adjustment unit YC, and a regenerative cooperation unit YK.

The operation amount sensor BA is provided to detect the operation amount Ba of the brake operation member (brake pedal) BP operated by the driver. The operation displacement sensor SP that detects the operation displacement Sp of the brake operation member BP is provided as the operation amount sensor BA. The operation force sensor FP is provided to detect the operation force Fp of the brake operation member BP. A simulator hydraulic pressure sensor PS is provided as the operation amount sensor BA so as to detect a hydraulic pressure (simulator hydraulic pressure) Ps in the stroke simulator SS. An input hydraulic pressure sensor PN is provided to detect a hydraulic pressure (an input hydraulic pressure) Pn in an input chamber Rn of the regenerative cooperation unit YK. The operation amount sensor BA is a general term for the above-mentioned operation displacement sensor SP and the like, and at least one of the operation displacement Sp, the operation force Fp, the simulator hydraulic pressure Ps, and the input hydraulic pressure Pn is adopted as the brake operation amount Ba. The detected brake operation amount Ba is input to the upper portion controller ECU. The master cylinder hydraulic pressure Pm does not correspond to the operation amount Ba in the second embodiment.

[Master Unit YM]

The master unit YM adjusts the hydraulic pressure (front wheel hydraulic pressure) Pwf in the front wheel cylinder CWf via the master cylinder chamber Rm. The master unit YM includes the master cylinder CM, a master piston PM, and a master elastic body SM.

The master cylinder CM is a stepped cylinder member (that is, including a small diameter portion and a large diameter portion) including a bottom portion. A single type master cylinder CM is adopted as the master cylinder CM. The master piston PM is a piston member inserted into the master cylinder CM, and includes a flange portion (flange) Tm. The master cylinder CM and the master piston PM are sealed by seals SLs. The master piston PM can move interlocked with an operation of the brake operation member BP. An interior of the master cylinder CM is partitioned into three hydraulic pressure chambers Rm, Rs, and Ro by the master piston PM. The master piston PM can move smoothly along a central axis Jm of the master cylinder CM.

The master cylinder chamber (also simply referred to as a "master chamber") Rm is a hydraulic pressure chamber partitioned by "a small diameter inner peripheral portion and a small diameter bottom portion of the master cylinder CM", and an end portion of the master piston PM. The master cylinder fluid passage HM is connected to the master chamber Rm, and is finally connected to the front wheel cylinder CWf (=CWi, CWj) via the lower portion fluid unit YL.

The interior of the master cylinder CM is partitioned into a servo hydraulic pressure chamber (also simply referred to as a "servo chamber") Rs and a reaction force hydraulic pressure chamber (also simply referred to as a "reaction force chamber") Ro by the flange portion Tm of the master piston PM. The servo chamber Rs is a hydraulic pressure chamber partitioned by "a large diameter inner peripheral portion and a large diameter bottom portion of the master cylinder CM", and the flange portion Tm of the master piston PM. The master chamber Rm and the servo chamber Rs are provided to face each other with the flange portion Tm sandwiched therebetween. A front wheel pressure adjustment fluid passage HF is connected to the servo chamber Rs, and the adjustment hydraulic pressure Pc from the pressure adjustment unit YC is introduced to the servo chamber Rs.

The reaction force chamber Ro is a hydraulic pressure chamber partitioned by the large diameter inner peripheral portion and a stepped portion of the master cylinder CM, and the flange portion Tm of the master piston PM. The reaction force chamber Ro is sandwiched by the master hydraulic pressure chamber Rm and the servo hydraulic pressure chamber Rs in a direction of the central axis Jm, and is located therebetween. Therefore, when a volume of the servo chamber Rs is increased, a volume of the reaction force chamber Ro is reduced. Conversely, when the volume of the servo chamber is reduced, the volume of the reaction force chamber is increased. A simulator fluid passage HS is connected to the reaction force chamber Ro. A fluid amount of the brake fluid BF in the upper portion fluid unit YU is adjusted by the reaction force chamber Ro.

The master elastic body (for example, a compression spring) SM is provided between the end portion of the master piston PM and the small diameter bottom portion of the master cylinder CM. The master elastic body SM presses the master piston PM against the large diameter bottom portion of the master cylinder CM in the direction of the central axis Jm of the master cylinder CM. When not braking, the master piston PM is in contact with the large diameter bottom portion of the master cylinder CM. A position of the master piston PM in this state is referred to as an "initial position of the master unit YM".

A through hole is provided in the master cylinder CM, and is connected to the reservoir RV through a supply fluid passage HU. When the master piston PM is in the initial position, the master chamber Rm is in communication with the reservoir RV through the through hole and the supply fluid passage HU.

The master chamber Rm applies, by an inner pressure (which is a "master cylinder hydraulic pressure" and also referred to as a "master hydraulic pressure") Pm thereof, a biasing force Fb (referred to as a "rearward force") to the master piston PM in a rearward direction Hb along the central axis Jm. The servo chamber Rs applies, by an inner pressure (that is, the introduced adjustment hydraulic pressure Pc) thereof, a biasing force (referred to as a "forward force") Fa to the master piston PM in a forward direction Ha opposite to the rearward force Fb. That is, in the master piston PM, the forward force Fa applied by the hydraulic pressure Pc in the servo chamber Rs and the rearward force Fb applied by the hydraulic pressure (master hydraulic pressure) Pm in the master chamber Rm are opposite to each other (face each other) in the direction of the central axis Jm and are statically balanced. The master cylinder hydraulic pressure sensor PQ is provided to detect the master hydraulic pressure Pm. For example, the master cylinder hydraulic pressure sensor PQ may be provided in the master cylinder fluid passage HM. In addition, the master cylinder hydraulic pressure sensor PQ may also be included in the lower portion fluid unit YL.

[Pressure Adjustment Unit YC]

Since the pressure adjustment unit YC is similar to that of the first embodiment described with reference to FIGS. 1 to 3, differences will be described. The pressure adjustment unit YC includes the electric pump DC, the check valve GC, the first and second pressure adjustment valves UB and UC, and the first and second adjustment hydraulic pressure sensors PB and PC. With the pressure adjustment unit YC, the brake hydraulic pressure Pwf of the front wheel WHf provided with the generator GN is independently adjusted within a range equal to or less than the brake hydraulic pressure Pwr of the rear wheel WHr not provided with the generator GN.

When the electric pump DC (MC+HP) is driven, the reflux (A) of the brake fluid BF is formed to be "HV→HP→GC→UB→UC→HX→RV→HV". That is, the fluid pump HP, the first and second pressure adjustment valves UB and UC, and the reservoir RV are included in the reflux path (A) of the brake fluid BF. As described in the first embodiment, the second pressure adjustment valve UC may be connected to the first reservoir fluid passage HV. In this case, the reflux path (A) is in an order of "HV→HP→GC→UB→UC→HV".

The two pressure adjustment valves UB and UC are provided in series in the reflux path (A). Specifically, in the reflux path (A), the first pressure adjustment valve UB is provided upstream and the second pressure adjustment valve UC is provided downstream. Each of the first and second pressure adjustment valves UB and UC is a normally ON linear electromagnetic valve (a proportional valve and a differential pressure valve) in which a valve opening amount (a lift amount) is continuously controlled by using an energization state (for example, a supply current). Since the first and second pressure adjustment valves UB and UC are provided in series in the pressure adjustment fluid passage HC, the second adjustment hydraulic pressure Pc adjusted by the second pressure adjustment valve UC is equal to or less than the first adjustment hydraulic pressure Pb. In other words, the second adjustment hydraulic pressure Pc is adjusted by the second pressure adjustment valve UC provided downstream so as to increase from "0 (atmospheric pressure)", and the first adjustment hydraulic pressure Pb is adjusted by the first pressure adjustment valve UB provided upstream so as to increase from the second adjustment hydraulic pressure Pc. The pressure adjustment unit YC is provided with the first and second adjustment hydraulic pressure sensors PB and PC to detect the first and second adjustment hydraulic pressures Pb and Pc. Since specifications (such as a pressure receiving area of the master piston PM) of the master unit YM are known, the mass cylinder hydraulic pressure sensor PQ may be used instead of the second adjustment hydraulic pressure sensor PC. That is, the second adjustment hydraulic pressure sensor PC can be omitted.

The pressure adjustment fluid passage HC is branched into a rear wheel pressure adjustment fluid passage HR at the portion Bh between the fluid pump HP and the first pressure adjustment valve UB. The rear wheel pressure adjustment fluid passage HR is connected to the rear wheel cylinder CWr via the lower portion fluid unit YL. Therefore, the first adjustment hydraulic pressure Pb is directly introduced (supplied) to the rear wheel wheel cylinder CWr. In addition, the pressure adjustment fluid passage HC is branched into the front wheel pressure adjustment fluid passage HF at the portion Bg between the first pressure adjustment valve UB and the second pressure adjustment valve UC. The front wheel pressure adjustment fluid passage HF is connected to the servo chamber Rs. Therefore, the second adjustment hydraulic pressure Pc is introduced (supplied) to the servo chamber Rs. Since the master cylinder CM is connected to the front wheel cylinder CWf via the lower portion fluid unit YL, the second adjustment hydraulic pressure Pc is introduced indirectly to the front wheel cylinder CWf via the master cylinder CM. Accordingly, the rear wheel hydraulic pressure Pwr of the rear wheel cylinder CWr is adjusted by the first adjustment hydraulic pressure Pb, and the front wheel hydraulic pressure Pwf of the front wheel cylinder CWf is adjusted by the second adjustment hydraulic pressure Pc.

Since the first adjustment hydraulic pressure Pb and the second adjustment hydraulic pressure Pc are adjusted independently and separately within the range of "Pb Pc", the front-rear distribution of the brake force is optimized, and the regenerative cooperative control is executed. Therefore, the deceleration and the stability of the vehicle can be ensured and the regenerative energy can be maximized.

[Regenerative Cooperation Unit YK]

A cooperative control over the friction braking and the regenerative braking (referred to as "regenerative cooperative control") is achieved by the regenerative cooperation unit YK. For example, a state in which the brake hydraulic pressure Pw is not generated whereas the brake operation member BP is operated can be formed by the regenerative cooperation unit YK. The regenerative cooperation unit YK includes an input cylinder CN, an input piston PK, an input elastic body SN, a first ON-OFF valve VA, a second ON-OFF valve VB, the stroke simulator SS, the simulator hydraulic pressure sensor PS, and the input hydraulic pressure sensor PN.

The input cylinder CN is a cylinder member having a bottom portion and fixed to the master cylinder CM. The input piston PK is a piston member inserted into the input cylinder CN. The input piston PK is mechanically connected to the brake operation member BP via a clevis (U-shaped link) so as to be interlocked with the brake operation member BP. The input piston PK is provided with a flange portion (flange) Tn. The input elastic body (for example, a compression spring) SN is provided between a mounting surface on which the input cylinder CN is mounted to the master cylinder CM and the flange portion Tn of the input piston PK. The input elastic body SN presses the flange portion Tn of the input piston PK against the bottom portion of the input cylinder CN in the direction of the central axis Jm.

When not braking, a stepped portion of the master piston PM is in contact with the large diameter bottom portion of the master cylinder CM, and the flange portion Tn of the input piston PK is in contact with the bottom portion of the input cylinder CN. When not braking, a gap Ks between an end surface Mq of the master piston PM and an end surface Mg of the input piston PK inside the input cylinder CN is set to a predetermined distance ks (referred to as an "initial gap"). That is, the master piston PM and the input piston PK are separated by the predetermined distance ks when the pistons PM and PK are located at positions (referred to as "initial positions" of the pistons) furthermost in the rearward direction Hb (a direction opposite to the forward direction Ha) (that is, when not braking). Here, the predetermined distance ks corresponds to a maximum value of the regeneration amount Rg. When the regenerative cooperation control is performed, the gap (also referred to as a "separation displacement") Ks is controlled (adjusted) by the adjustment hydraulic pressure Pc.

When the brake operation member BP is depressed from a state of "Ba=0", the input piston PK is moved from the initial position to the forward direction Ha (a direction in which the brake hydraulic pressure Pw increases). At this time, when the adjustment hydraulic pressure Pc is still "0", the master piston PM is still at the initial position. Therefore, the gap Ks (a distance between the end surface Mg and the end surface Mq) gradually reduces as the input piston PK advances. On the other hand, when the adjustment hydraulic pressure Pc is increased from "0", the master piston PM is moved from the initial position to the forward direction Ha. Therefore, the gap Ks can be adjusted by the adjustment hydraulic pressure Pc independently of the brake operation amount Ba in a range of "0≤Ks≤ks". That is, the adjustment hydraulic pressure Pc is adjusted, thereby adjusting the gap Ks between the input piston PK and the master piston PM, and achieving the regenerative cooperation control.

The input chamber Rn of the regeneration cooperation unit YK and the reaction force chamber Ro of the master unit YM are connected via the simulator fluid passage HS. The simulator fluid passage HS is provided with the first ON-OFF valve VA. The first ON-OFF valve VA is a normally OFF electromagnetic valve having an ON position and an OFF position. A third reservoir fluid passage HT is connected to a portion Bs between the first ON-OFF valve VA of the simulator fluid passage HS and the reaction force chamber Ro. The third reservoir fluid passage HT is provided with the second ON-OFF valve VB. The second ON-OFF valve VB is a normally ON electromagnetic valve having an ON position and an OFF position. The first and second ON-OFF valves VA and VB are two-position electromagnetic valves (ON-OFF valves) having an ON position (communication state) and an OFF position (cut-off state). The first and second ON-OFF valves VA and VB are controlled by the upper portion controller ECU by using drive signals Va and Vb. When the brake control device SC is activated, energization to the first and second ON-OFF valves VA and VB is started. Then, the first ON-OFF valve VA is at the ON position and the second ON-OFF valve VB is at the OFF position.

The simulator SS is connected to the simulator fluid passage HS at a portion Bo between the first ON-OFF valve VA and the reaction force chamber Ro. In other words, the input chamber Rn of the regenerative cooperation unit YK is connected to the simulator SS via the simulator fluid passage HS. During the regenerative cooperation control, the first ON-OFF valve VA is at the ON position and the second ON-OFF valve VB is at the OFF position. The second ON-OFF valve VB is at the OFF position, so that a flow path to the reservoir RV is cut off in the third reservoir fluid passage HT. Therefore, the brake fluid BF moves from the input chamber Rn of the input cylinder CN to the simulator SS. Since a force for preventing inflow of the brake fluid BF is applied to a piston of the simulator SS by an elastic body, the operation force Fp when the brake operation member BP is operated is generated.

The third reservoir fluid passage HT is connected to the reservoir RV. A part of the third reservoir fluid passage HT can be shared with the first and second reservoir fluid passages HV and HX. However, it is desirable that the first and second reservoir fluid passages HV and HX and the third reservoir fluid passage HT are separately connected to the reservoir RV. The fluid pump HP absorbs the brake fluid BF from the reservoir RV via the first reservoir fluid passage HV. At this time, air bubbles may be mixed in the first reservoir fluid passage HV. Therefore, the third reservoir fluid passage HT is directly connected to the reservoir RV to prevent the air bubbles from mixing into the input cylinder CN and the like.

The simulator fluid passage HS between the first ON-OFF valve VA and the reaction force chamber Ro is provided with the simulator hydraulic pressure sensor PS so as to detect a hydraulic pressure Ps in the simulator SS (referred to as a "simulator hydraulic pressure"). The simulator fluid passage HS between the first ON-OFF valve VA and the input chamber Rn is provided with the input hydraulic pressure sensor PN so as to detect a hydraulic pressure Pn in the input chamber Rn (referred to as an "input hydraulic pressure"). Each of the simulator hydraulic pressure sensor PS and the input hydraulic pressure sensor PN is one of the above-mentioned brake operation amount sensors BA. Detected hydraulic pressures Ps and Pn are input into the upper portion controller ECU as the brake operation amount Ba. Here, since "Ps=Pn" when the first and second ON-OFF valves VA and VB are energized, one of the simulator hydraulic pressure sensor PS and the input hydraulic pressure sensor PN can be omitted.

The electric motor MC and the electromagnetic valves VA, VB, UB, and UC are controlled by the upper portion controller ECU by using the brake operation amount Ba (Sp, Fp, Ps and Pn), the vehicle body speed Vx, and the adjustment hydraulic pressures (detected values) Pb and Pc. Specifically, in the upper portion controller ECU, the drive signals Va, Vb, Ub, and Uc for controlling the various electromagnetic valves VA, VB, UB, and UC are calculated. Similarly, the drive signal Mc for controlling the electric motor MC is calculated. By using the drive signals Va, Vb, Ub, Uc and Mc, the electromagnetic valves VA, VB, UB, UC, and the electric motor MC are driven. The master cylinder hydraulic pressure Pm may be adopted instead of the second adjustment hydraulic pressure Pc. In this case, the actual differential pressure Sa is calculated by "Sa=Pb−Pm".

In the second embodiment, the first and second pressure adjustment valves UB, UC, and the electric pump DC are controlled similar to the first embodiment, and as a result, similar effects are achieved. The front wheel brake hydraulic pressure Pwf and the rear wheel brake hydraulic pressure Pwr are individually adjusted by the first and second adjustment hydraulic pressures Pb and Pc. The sufficient regenerative energy can be ensured, and the front-rear distribution of the brake force is appropriate. Therefore, the deceleration and the direction stability of the vehicle can be ensured.

When the hydraulic pressure Pc provided downstream changes, the flow rate passing through the first pressure adjustment valve UB provided upstream changes. Therefore, the hydraulic pressure interference occurs, and the pressure adjustment accuracy of the hydraulic pressure Pb provided upstream is reduced. The first and second pressure adjustment valves UB and UC are driven and controlled by using the required flow rates (first and second required flow rates) Qb and Qc. The first and second pressure adjustment valves UB and UC are provided in series in the reflux path (A), but since the flow rate to be flowed to each of the first and second pressure adjustment valves UB and UC is considered, the hydraulic pressure interference can be prevented in the hydraulic pressure control. In particular, downstream of the first pressure adjustment valve UB provided upstream, the valve opening amount is controlled by using the front wheel adjustment flow rate (flow rate to be supplied to the servo chamber Rs) Qf that is required for increasing the front wheel brake hydraulic pressure Pwf. Accordingly, the variation in the rear wheel brake hydraulic pressure Pwr (=Pb) is reduced.

Further, the target rotation speed Nt of the electric pump DC is determined by using the total flow rate (Qf+Qr). Then, the electric pump DC is feedback-controlled such that the actual rotation speed Na matches the target rotation speed Nt. That is, the rotation speed of the electric pump DC is increased only when the increase in the brake hydraulic pressure Pw is required in accordance with the hydraulic pressure change amount dP, so that power saving of the brake control device SC can be achieved. Since the rotation speed of the electric pump DC is increased as the hydraulic pressure change amount dP increases, even when the brake operation member BP is suddenly operated, a sufficient fluid amount is supplied to the wheel cylinder CW, the responsiveness of the brake hydraulic pressure Pw is ensured, and the pressure adjustment accuracy by the feedback control is improved.

<Operation and Effect of Brake Control Device SC>

An operation and an effect of the brake control device SC will be described with reference to a characteristic diagram in FIG. 5A and a time series diagram in FIG. 5B. The brake control device SC is applied to a vehicle including the regenerative generator GN at the front wheel WHf. In the brake control device SC, the reflux path (A) of the brake fluid BF including the electric pump DC is formed, and the first pressure adjustment valve UB and the second pressure adjustment valve UC are provided in series. The brake fluid BF discharged from the electric pump DC is adjusted to the first hydraulic pressure Pb by the first pressure adjustment valve UB provided upstream. The hydraulic pressure (rear wheel hydraulic pressure) Pwr of the rear wheel cylinder CWr provided on the rear wheel WHr of the vehicle is adjusted by the first hydraulic pressure Pb. The first hydraulic pressure Pb is reduced to the second hydraulic pressure Pc by the second pressure adjustment valve UC provided downstream. The hydraulic pressure (front wheel hydraulic pressure) Pwf of the front wheel cylinder CWf provided on the front wheel WHf is adjusted by the second hydraulic pressure Pc.

Figure 5B:
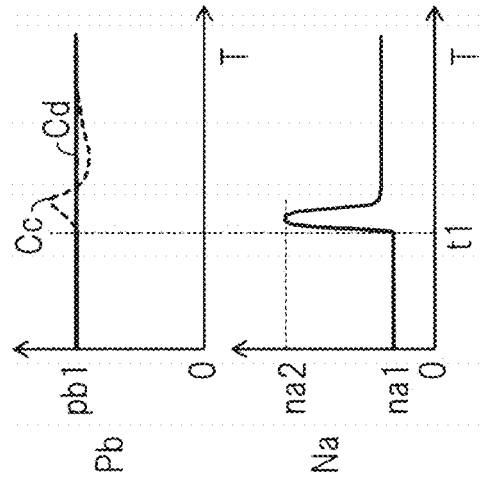
FIGS. 5A and 5B are a characteristic diagram and a time series diagram for illustrating an operation and an effect.
Figure 5A:
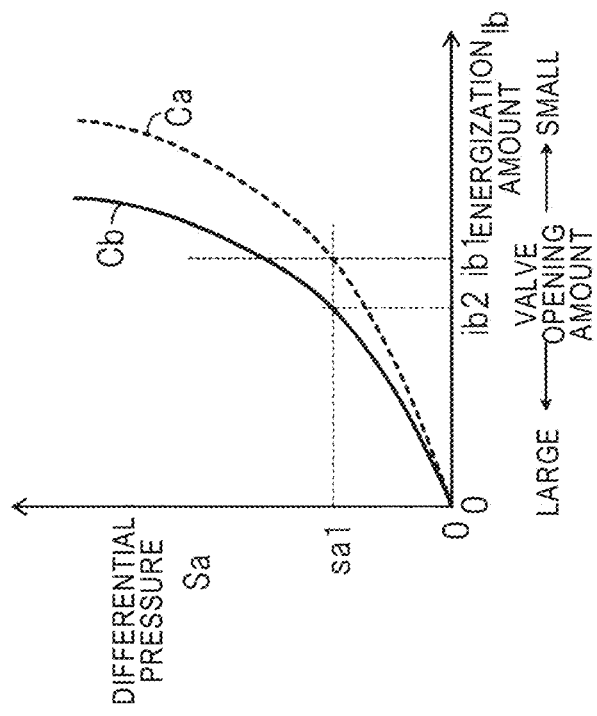

FIG. 5A shows a relationship between the energization amount Ib and the differential pressure Sa in the first pressure adjustment valve UB provided upstream in the reflux path (A). Since the first pressure adjustment valve UB is normally ON, the smaller the energization amount Ib, the larger the valve opening amount, and the larger the energization amount Ib, the smaller the valve opening amount (at fully ON state when "Ib=0"). For example, as shown in a characteristic Ca, when a value ib1 is energized in the first pressure adjustment valve UB and a certain flow rate is supplied to the first pressure adjustment valve UB, the differential pressure Sa becomes the value sa1. When the flow rate is increased while "Ib=ib1" remains, the valve opening amount is the same, so the differential pressure Sa increases.

FIG. 5B shows a change in the rotation speed Na of the electric pump DC and a change in the first adjustment hydraulic pressure Pb when the operation amount Ba is constant and the replacement operation of the regenerative cooperative control (transition operation from the regenerative brake force to the friction brake force) is performed. At a time point 1, the replacement operation is started. Since the front wheel and rear wheel hydraulic pressure change amounts dPf, and dPr are "0" before the replacement operation, the rotation speed Na of the electric pump DC is constant at a value na1. When the replacement operation is started, the front wheel target hydraulic pressure Ptf is increased. Therefore, the front wheel hydraulic pressure change amount dPf becomes larger than "0", and the rotation speed Na of the electric pump DC is increased from the value na1 to a value na2, and the discharge flow rate of the electric pump DC is increased. When the front wheel and the rear wheel hydraulic pressure change amounts dPf and dPr are both equal to or less than "0", the reference flow rate value Qo may be set to "0", and the rotation of the electric pump DC may be stopped. In this case, the rotation speed Na of the electric pump DC is increased from "0" to the value na2.

Even if the discharge flow rate of the electric pump DC is constant, when the valve opening amount of the first pressure adjustment valve UB is constant and the second adjustment hydraulic pressure Pc provided downstream is increased or decreased, the flow rate flowing through the first pressure adjustment valve UB changes, and the first adjustment hydraulic pressure Pb changes. The so-called hydraulic pressure interference occurs, and the first adjustment hydraulic pressure Pb provided upstream varies. Further, as described in the characteristic diagram in FIG. 5A, when the discharge flow rate of the electric pump DC is increased, the first adjustment hydraulic pressure Pb increases noticeably. The first adjustment hydraulic pressure Pb to be maintained constant at a value pb1 is increased as shown in a characteristic Cc. Finally, the feedback control involving the first pressure adjustment valve UB returns to the value pb1, but a transient variation in the hydraulic pressure occurs.

In order to prevent the above hydraulic pressure variation, "the front wheel adjustment flow rate (front wheel flow rate) Qf required for the front wheel cylinder CWf to increase the front wheel brake hydraulic pressure (front wheel hydraulic pressure) Pwf" is calculated by using the operation amount Ba and the regeneration amount (Fg, Fx, Rg) of the regenerative generator GN. The first required flow rate Qb (=Qo+Qf) is calculated by using the front wheel flow rate Qf. By using the first required flow rate Qb, the first required energization amount Isb for adjusting the rear wheel hydraulic pressure Pwr is determined, and the first pressure adjustment valve UB is controlled. In other words, in the brake control device SC, the first pressure adjustment valve UB is controlled by using the front wheel adjustment flow rate Qf required downstream of the first pressure adjustment valve UB. At this time, it is determined that the larger the first required flow rate Qb (that is, the front wheel adjustment flow rate Qf), the smaller the first target energization amount Itb for the rear wheel adjustment, and the valve opening amount of the first pressure adjustment valve UB is increased. For example, as indicated by a characteristic Cb, the actual energization amount Ib is reduced from the value ib1 to the value ib2, and the actual differential pressure Sa is maintained at the value sa1. When the discharge flow rate of the electric pump DC is increased, the first target energization amount Itb (as a result, the first actual energization amount Ib) is reduced, and the valve opening amount of the first pressure adjustment valve UB provided upstream is increased, so that the variation in the first adjustment hydraulic pressure Pb can be prevented and can be maintained at the value pb1 as shown in a characteristic Cd.

In the brake control device SC, in addition to the front wheel flow rate Qf, "the rear wheel adjustment flow rate (rear wheel flow rate) Qr required for the rear wheel cylinder Cwr to increase the rear wheel brake hydraulic pressure (rear wheel hydraulic pressure) Pwr" is calculated by using the operation amount Ba and the regeneration amount (Fg, Fx, Rg) of the regenerative generator GN. The target flow rate Qt is determined by using the sum (total flow rate) of the front wheel flow rate Qf and the rear wheel flow rate Qr. Then, by using the target flow rate Qt, the target rotation speed Nt is determined, and the electric pump DC is feedback-controlled such that the actual rotation speed Na of the electric pump DC approaches (finally, matches) the target rotation speed Nt.

The rotation speeds Nt and Na of the electric pump DC are increased only when an increase in the brake hydraulic pressure Pw is required, so that power saving of the brake control device SC can be achieved. In addition, as the hydraulic pressure change amount dP increases, the rotation speeds Nt and Na of the electric pump DC increase. Therefore, even when the brake operation member BP is suddenly operated, a sufficient fluid amount (volume of the brake fluid BF) is supplied to the wheel cylinder CW, the brake hydraulic pressure Pw is rapidly increased, and the responsiveness thereof is ensured. Further, since a time delay in the feedback control by using the hydraulic pressure deviations hPf and hS is prevented, the pressure adjustment accuracy of the brake hydraulic pressure Pw is improved.

Other Embodiments

Hereinafter, other embodiments will be described. In other embodiments, similar effects as described above are also achieved. In the above embodiments, the generator GN is provided at the front wheel WHf, but may be provided at the rear wheel WHr. In this case, similar as described above, the reflux path (A) of the brake fluid BF including the electric pump DC is also formed, and the first pressure adjustment valve UB and the second pressure adjustment valve UC are provided in series. The brake fluid BF discharged from the electric pump DC is adjusted to the first hydraulic pressure Pb by the first pressure adjustment valve UB provided upstream, and the first hydraulic pressure Pb is reduced to the second hydraulic pressure Pc by the second pressure adjustment valve UC provided downstream.

Specifically, in the fluid passage configuration of the first embodiment, the front wheel introduction fluid passage HDf is connected to the portion Bh, and the rear wheel introduction fluid passage HDr is connected to the portion Bg. That is, the first adjustment hydraulic pressure Pb is introduced into the front wheel cylinder CWf, and the second adjustment hydraulic pressure Pc is introduced into the rear wheel cylinder CWr. In the fluid passage configuration of the second embodiment, the front wheel pressure adjustment fluid passage HF is connected to the portion Bh, and the rear wheel pressure adjustment fluid passage HR is connected to the portion Bg. That is, the first adjustment hydraulic pressure Pb is supplied to the servo chamber Rs, and the front wheel cylinder CWf is adjusted by the first adjustment hydraulic pressure Pb. The second adjustment hydraulic pressure Pc is supplied to the rear wheel cylinder CWr. Therefore, when the generator GN is provided in the rear wheel WHr, the front wheel hydraulic pressure Pwf of the front wheel cylinder CWf is adjusted by the first adjustment hydraulic pressure Pb, and the rear wheel hydraulic pressure Pwr of the rear wheel cylinder CWr is adjusted by the second adjustment hydraulic pressure Pc.

Similarly, "the front wheel flow rate Qf required for the front wheel cylinder Cwf to increase the front wheel hydraulic pressure Pwf" and "the rear wheel flow rate Qr required for the rear wheel cylinder Cwr to increase the rear wheel hydraulic pressure Pwr" are calculated by using the brake operation amount Ba and the regeneration amount (Fg, Fx, Rg) of the regenerative generator GN. The first required flow rate Qb is calculated by using the rear wheel flow rate Qr (for example, "Qb=Qo+Qr"). The second required flow rate Qc is calculated by using the reference flow rate Qo (for example, "Qc=Qo"). A valve opening state of the first pressure adjustment valve UB is controlled by using the first required energization amount Isb in accordance with the first required flow rate Qb.

In the brake control device SC applied to the vehicle including the regenerative generator GN in the rear wheel WHr, the first pressure adjustment valve UB is controlled by using the rear wheel flow rate Qr. When the discharge flow rate of the electric pump DC is increased, by using the rear wheel flow rate Qr, the first target energization amount Itb for adjusting the front wheel hydraulic pressure Pwf is reduced, and the valve opening amount of the first pressure adjustment valve UB is increased. For example, in the replacement operation of the regenerative cooperative control, the hydraulic pressure interference occurred when the second adjustment hydraulic pressure Pc provided downstream is changed (increased) is prevented. That is, the variation in the first adjustment hydraulic pressure Pb can be prevented, and the first adjustment hydraulic pressure Pb can be maintained at a constant value.

The target flow rate Qt is calculated by using the total flow rate (Qf+Qr) which is the sum of the front wheel flow rate Qf and the rear wheel flow rate Qr, and the target rotation speed Nt is determined accordingly. Then, the electric pump DC is feedback-controlled such that the actual rotation speed Na of the electric pump DC approaches (finally, matches) the target rotation speed Nt. Accordingly, the rotation speeds Nt and Na of the electric pump DC are increased only when an increase in the brake hydraulic pressure Pw is required, so that power saving of the brake control device SC can be achieved. As the hydraulic pressure change amount dP increases, the rotation speeds Nt and Na of the electric pump DC increase. Therefore, when the brake operation member BP is suddenly operated and a sudden pressure increase is required, the rotation speeds Nt and Na of the electric pump DC are increased, the sufficient fluid amount is supplied to the wheel cylinder CW, the responsiveness of the brake hydraulic pressure Pw is ensured, and the pressure adjustment accuracy is improved.

The invention claimed is:

1. A brake control device for a vehicle including a regenerative generator connected to a front wheel of a vehicle, the brake control device for a vehicle comprising:
   a pressure adjustment unit including an electric pump, a first pressure adjustment valve, and a second pressure adjustment valve, wherein
      the first pressure adjustment valve is provided in a reflux path of a brake fluid including the electric pump, configured to adjust a pressure of the brake fluid discharged by the electric pump to a first hydraulic pressure, and configured to adjust a rear wheel hydraulic pressure in a rear wheel cylinder provided with a rear wheel of the vehicle to the first hydraulic pressure, and the second pressure adjustment valve is provided in the reflux path, configured to reduce the first hydraulic pressure to a second hydraulic pressure, and configured to adjust a front wheel hydraulic pressure in a front wheel cylinder provided with the front wheel to the second hydraulic pressure; and a controller configured to control the electric pump, the first pressure adjustment valve, and the second pressure adjustment valve, wherein the controller is configured to calculate a front wheel flow rate to increase the front wheel hydraulic pressure by using an operation amount of a brake operation member of the vehicle and a regeneration amount of the regenerative generator, and control the first pressure adjustment valve by using the front wheel flow rate.

2. The brake control device for a vehicle according to claim 1, wherein the controller is configured to calculate a rear wheel flow rate to increase the rear wheel hydraulic pressure by using the operation amount and the regeneration amount, and control the electric pump by using the front wheel flow rate and the rear wheel flow rate.

3. A brake control device for a vehicle including a regenerative generator connected to a rear wheel of a vehicle, the brake control device for a vehicle comprising:

a pressure adjustment unit including an electric pump, a first pressure adjustment valve, and a second pressure adjustment valve, wherein the first pressure adjustment valve is provided in a reflux path of a brake fluid including the electric pump, configured to adjust a pressure of the brake fluid discharged by the electric pump to a first hydraulic pressure, and configured to adjust a front wheel hydraulic pressure of a front wheel cylinder provided with a front wheel of the vehicle to the first hydraulic pressure, and the second pressure adjustment valve is provided in the reflux path, configured to reduce the first hydraulic pressure to a second hydraulic pressure, and configured to adjust a rear wheel hydraulic pressure in a rear wheel cylinder provided with the rear wheel to the second hydraulic pressure; and a controller configured to control the electric pump, the first pressure adjustment valve, and the second pressure adjustment valve, wherein the controller is configured to calculate a rear wheel flow rate to increase the rear wheel hydraulic pressure by using an operation amount of a brake operation member of the vehicle and a regeneration amount of the regenerative generator, and control the first pressure adjustment valve by using the rear wheel flow rate.

4. The brake control device for a vehicle according to claim 3, wherein the controller is configured to calculate a front wheel flow rate to increase the front wheel hydraulic pressure by using the operation amount and the regeneration amount, and control the electric pump by using the front wheel flow rate and the rear wheel flow rate.

* * * * *